(12) United States Patent
Piche

(10) Patent No.: US 7,844,351 B2
(45) Date of Patent: Nov. 30, 2010

(54) MODEL BASED OPTIMIZATION OF MULTIPLE POWER GENERATING UNITS

(75) Inventor: Stephen Piche, Austin, TX (US)

(73) Assignee: Pegasus Technologies, Inc., Chardon, OH (US)

(*) Notice: Subject to any disclaimer, the term of this patent is extended or adjusted under 35 U.S.C. 154(b) by 0 days.

(21) Appl. No.: 12/547,558

(22) Filed: Aug. 26, 2009

(65) Prior Publication Data
US 2009/0319092 A1    Dec. 24, 2009

Related U.S. Application Data

(62) Division of application No. 11/314,214, filed on Dec. 21, 2005, now Pat. No. 7,599,750.

(51) Int. Cl.
*G05D 3/12* (2006.01)
*G05B 13/02* (2006.01)

(52) U.S. Cl. .............................. 700/36; 700/29; 700/286
(58) Field of Classification Search .................. 700/29, 700/32, 44, 286, 28, 33, 36; 703/7
See application file for complete search history.

(56) References Cited

U.S. PATENT DOCUMENTS

| | | | |
|---|---|---|---|
| 4,208,712 A | 6/1980 | Deutsch | 364/105 |
| 5,167,009 A | 11/1992 | Skeirik | 395/27 |
| 5,280,756 A | 1/1994 | Labbe | 110/191 |
| 5,347,466 A | 9/1994 | Nichols et al. | 703/18 |
| 5,353,207 A | 10/1994 | Keeler et al. | 364/164 |
| 5,386,373 A | 1/1995 | Keeler et al. | 364/577 |
| 5,408,586 A | 4/1995 | Skeirik | 395/23 |
| 5,825,646 A | 10/1998 | Keeler et al. | 364/164 |
| 5,873,251 A | 2/1999 | Iino | 60/660 |
| 5,933,345 A | 8/1999 | Martin et al. | 364/164 |
| 5,993,345 A | 11/1999 | Mott | 474/202 |
| 6,278,899 B1 | 8/2001 | Piche et al. | 700/44 |
| 6,289,266 B1 | 9/2001 | Payson et al. | 700/274 |
| 6,381,504 B1 | 4/2002 | Havener et al. | 700/44 |
| 6,487,459 B1 | 11/2002 | Martin et al. | 700/44 |
| 6,488,076 B1 * | 12/2002 | Yasuda et al. | 165/4 |
| 6,678,585 B1 | 1/2004 | Havener | 700/295 |
| 6,712,604 B2 | 3/2004 | Havlena | 431/12 |

(Continued)

OTHER PUBLICATIONS

Bhat, N., Minderman, P., McAvoy, T., and Wang, N., "Modeling Chemical Process Systems via Neural Computation," *IEEE Control Systems Magazine*, pp. 24-30, Apr. 1990.

(Continued)

*Primary Examiner*—Ryan A Jarrett
(74) *Attorney, Agent, or Firm*—Kusner & Jaffe

(57) ABSTRACT

A method and apparatus for optimizing the operation of a single or multiple power generating units using advanced optimization, modeling, and control techniques. In one embodiment, a plurality of component optimization systems for optimizing power generating unit components are sequentially coordinated to allow optimized values determined by a first component optimization system to be fed forward for use as an input value to a subsequent component optimization system. A unit optimization system may be provided to determine goals and constraints for the plurality of component optimization systems in accordance with economic data. In one embodiment of the invention, a multi-unit optimization system is provided to determine goals and constraints for component optimization systems of different power generating units. Both steady state and dynamic models are used for optimization.

22 Claims, 21 Drawing Sheets

U.S. PATENT DOCUMENTS

| | | | |
|---|---|---|---|
| 6,725,208 | B1 | 4/2004 | Hartman et al. ............... 706/23 |
| 6,944,616 | B2 | 9/2005 | Ferguson et al. .............. 707/10 |
| 7,398,652 | B1 | 7/2008 | Kosvic et al. ................ 60/664 |
| 2005/0171880 | A1 | 8/2005 | Lefebvre et al. ............. 705/35 |
| 2005/0192680 | A1* | 9/2005 | Cascia et al. .................. 700/29 |
| 2006/0045800 | A1 | 3/2006 | Boyden et al. ............... 422/62 |
| 2006/0178762 | A1 | 8/2006 | Wroblewski et al. .......... 700/30 |
| 2007/0156288 | A1 | 7/2007 | Wroblewski et al. ........ 700/266 |

OTHER PUBLICATIONS

Barto, A., "Connectionist Learning for Control," in *Neural Networks for Control*, edited by Miller, W., Sutton, R. and Werbos, P., MIT Press, pp. 5-58, 1990.

Widrow, B., and Lehr, M., "Perceptrons, Adalines, and Backpropagation," *Proceedings of the IEEE*, pp. 719-724, Sep. 1990.

Werbos, P., "Backpropagation: Basics and New Developments," *Proceedings of the IEEE*, pp. 134-138, Sep. 1990.

Piche, S., Sayyar-Rodsari, B., Johnson, D., and Gerules, M., "Nonlinear Model Predictive Control Using Neural Networks," *IEEE Control Systems Magazine*, vol. 20, No. 3, Jun. 2000.

Piche, S., and Sabiston, P., "A Disturbance Rejection Based Neural Network Algorithm for Control of Air Pollution Emissions," *Proc. of Int. Joint Conf. on NN*, Montreal, Canada, Aug. 2005.

Bishop, C., "Neural Networks for Pattern Recognition," Chapter 3, Clarendon Press, Oxford, 1995.

Piche, S., "Steepest Descent Algorithm for Neural Network Controller and Filters," *IEEE Trans. on Neural Networks*, vol. 5, No. 2, pp. 198-212, 1995.

Schittkowski et al., "Nonlinear Programming," Department of Mathematics, University of Bayreuth, D-95440 Bayreuth, Germany, 2003.

Winn, H., Chomiak, T., Stultz, S. And Soltysiak, W., "Optimization of Cyclone Boilers Utilizing Neural Network Technology," *Proc. of Joint ISA POWID/EPRI Controls and Instrumentation Conference*, 2004.

Labbe, D., Coker, S., and Speziale, A., "Entergy Independence NOx/ Heat Rate Optimization and Steam Temperature Control with Neural Net/Model Predictive Control Combo," *Proc. of Joint ISA POWID/ EPRI Controls and Instrumentation Conference*, Nashville, 2005.

James, R., Keisling, D., Lynch, M., and Spinney, P., "Optimization with ProcessLink at the Roanoke Valley Energy Facility," *Proc. of PowerGen 2000*, Orlando, FL, Nov. 200.

Sanjuan, M., "NOx Control Strategies at City Public Service of San Antonio," *Proc. of Electric Power Conference*, Houston, TX, Apr. 2002.

Boyden, S., Piche, S., and Czarnecki, L., "Advanced SCR Control for Dynamic Ammonia Distribution," NETL Conference on SCR and SNCR for NOx Control, Pittsburgh, PA, Oct. 2003.

Partlow, B., Marz, P., Joffrion, V., and Grusha, J., "Experience with Advanced Controls when Combines with an Ultra Low NOx Combustion System," *Proc. of PowerGen*, 2003.

Psaltis, D., Sideris, A., and Yamamura, A., "Multilayered Neural Network Controller," IEEE Control Systems Magazine, Apr. 1988.

Boyden, S., "Rolling Average Emission Control," Combined Power Plant Air Pollution Control Mega Symposium, Washington, DC, Aug. 30-Sep. 2, 2004.

L. Serra and C. Torres, "Structural Theory of Thermoeconomics," Encyclopedia of Life Support Systems, http://www.eolss.net (2003): 1-17.

J. Uche, L. Serra, L.A. Herrero, A. Valero, J.A. Turegano, and C. Torres, "Software for the Analysis of Water and Energy Systems," Desalination 156 (2003): 367-378.

M.A. Lozano, A. Valero, L. Serra, "Local Optimization of Energy Systems," AES-vol. 36, Proceedings of the ASME Advanced Energy Division (1996): 241-250.

J. Uche, L. Serra, and A. Valero, "Thermoeconomic Optimization of a Dual-purpose Power and Desalination Plant," Desalination 136 (2001) 147-158.

\* cited by examiner

MODEL BASED OPTIMIZATION OF MULTIPLE POWER GENERATING UNITS

RELATED APPLICATIONS

This application is a divisional of U.S. application Ser. No. 11/314,214, filed Dec. 21, 2005 now U.S. Pat. No. 7,559,750, and is hereby fully incorporated herein by reference.

FIELD OF THE INVENTION

The present invention relates generally to the operation of a single or multiple power generating units, and more particularly to a method and apparatus for optimizing the operation of a single or multiple power generating units using advanced optimization, modeling, and control techniques.

BACKGROUND OF THE INVENTION

In a conventional fossil fuel-fired (e.g., coal-fired) power generating unit, a fossil fuel/air mixture is ignited in a boiler. Large volumes of water are pumped through tubes inside the boiler, and the intense heat from the burning fuel turns the water in the boiler tubes into high-pressure steam. In an electric power generating application, the high-pressure steam from the boiler passes into a turbine comprised of a plurality of turbine blades. Once the steam hits the turbine blades, it causes the turbine to spin rapidly. The spinning turbine causes a shaft to turn inside a generator, creating an electric potential.

As used herein, the term "power generating plant" refers to one or more power generating units. Each power generating unit drives one or more turbines used for generating electricity. A power generating unit is typically powered by fossil fuels (including but not limited to, coal, natural gas or oil), and includes a boiler for producing high temperature steam; air pollution control (APC) devices for removal of pollutants from flue gas; a stack for release of flue gas; and a water cooling system for condensing the high temperature steam. A typical power generating unit will be described in detail below.

Boiler combustion or other characteristics of a fossil fuel-fired power generating unit are influenced by dynamically varying parameters of the power generating unit, including, but not limited to, air-to-fuel ratios, operating conditions, boiler configuration, stag/soot deposits, load profile, fuel quality and ambient conditions. Changes to the business and regulatory environments have increased the importance of dynamic factors such as fuel variations, performance criteria, emissions control, operating flexibility and market driven objectives (e.g., fuel prices, cost of emissions credits, cost of electricity, etc.).

About one half of the electric power generated in the United States is generated using coal-fired power generating units. Coal-fired power generating units used in power plants typically have an assortment of air pollution control (APC) devices installed for reducing nitrogen oxides (NOx), sulfur oxides (SOx), and particulate emissions. In this regard, selective catalytic reduction (SCR) systems are used for NOx reductions. Spray dry absorbers (SDA) and wet flue gas desulfurization (FGD) systems are used for SOx reductions. Electro-static precipitators (ESPs) and fabric filters (FF) are used for reducing particulate emissions.

Over the past decade, combustion optimization systems have been implemented for advanced control of the combustion process within the furnace. Typically, combustion optimization systems interface with the distributed control system (DCS) of a power generating unit. Based upon the current operating conditions of the power generating unit, as well as a set of operator specified goals and constraints, the combustion optimization system is used to compute the optimal fuel-to-air staging within the furnace to achieve the desire goals and constraints.

Combustion optimization systems were originally implemented to reduce nitrogen oxides (NOx) produced in the furnace and emitted to the atmosphere via the stack. U.S. Pat. No. 5,280,756 to Labbe et al. (issued Jan. 25, 1994) teaches a method and system for controlling and providing guidance in reducing NOx emissions based upon controllable combustion parameters and model calculations while maintaining satisfactory plant performance. U.S. Pat. No. 5,386,373 to Keeler et al. (issued Jan. 31, 1995) teaches the use of a predictive model of emissions including NOx in conjunction with a control system. U.S. Pat. No. 6,381,504 to Havener et al. (issued Apr. 30, 2002) describes a method for optimally determining the distribution of air and fuel within a boiler by aggregating the distributions of air and fuel into two common variables, performing an optimization, and then computing the optimal distribution of fuel and air based upon the optimal values of the aggregated variables. U.S. Pat. No. 6,712,604 issued to Havlena (issued Mar. 30, 2004) describes a system for controlling the combustion of fuel and air in a boiler such that the distributions of NOx and CO are maintained to average less than the maximum permitted levels.

Recently, combustion optimization approaches have been used to control boiler parameters in addition to NOx, including unit heat rate, boiler efficiency, and mercury emissions. U.S. patent application Ser. No. 10/985,705 (filed Nov. 10, 2004) entitled "System for Optimizing a Combustion Heating Process" (fully incorporated herein by reference) teaches an approach to modeling controllable losses in a power generating unit and a method for optimizing the combustion process based upon these controllable losses. U.S. patent application Ser. No. 11/301,034 (filed Dec. 12, 2005) entitled "Model Based Control and Estimation of Mercury Emissions" (fully incorporated herein by reference) teaches a system and method for reducing mercury emissions from a coal-fired power plant while observing limits on the amount of carbon in the fly ash produced by the combustion process.

The success of combustion optimization systems on boilers in power generating units has motivated the use of optimization approaches on other components within a power generating unit, such as an FGD and SCR. U.S. patent application Ser. No. 10/927,229 (filed Aug. 27, 2004), entitled "Optimized Air Pollution Control" (fully incorporated herein by reference) teaches a controller for directing operation of an air pollution control system, such as an FGD or SCR, such that a predefined optimization objective is minimized. For an FGD, the optimization objective may include minimization of $SO_2$ emissions while maintaining an operation constraint, such as the purity of a by-product (gypsum), above a specified limit. For an SCR, the optimization may include minimization of NOx emissions while observing an operation constraint, such as a limit on the amount of ammonia in the flue gas exiting the SCR.

As outlined above, the prior art describes optimization of specific components within a power generating unit, such as the boiler, FGD and SCR. However, the prior art does not describe a coordinated approach to optimization of multiple components, within a single power generating unit or multiple power generating units, to achieve multi-pollutant reductions (NOx, SOx, Mercury, CO and particulate matter), minimize costs, and maximize efficiency.

The present invention provides a system that overcomes the abovementioned drawbacks of the prior art, and provides advantages over prior art approaches to control and optimization of power generating units.

SUMMARY OF THE INVENTION

In accordance with the present invention, there is provided a system for optimizing operation of at least one power generating unit comprised of a plurality of components. The system comprises a plurality of component optimization systems respectively associated with each of said plurality of components, wherein each component optimization system includes: (a) a model of the component, said model receiving input values associated with manipulated variables and disturbance variables, and predicting an output value for at least one controlled variable associated with operation of said component, and (b) an optimizer for determining optimal setpoint values for manipulated variables associated with control of the component, said optimal setpoint values determined in accordance with one or more goals and constraints associated with operation of the component.

In accordance with another aspect of the present invention, there is provided a system for optimizing operation of a plurality of power generating units, each of said plurality of power generating units comprised of a plurality of components. The system comprises: at least one component optimization system associated with each of said plurality of power generating units; a multi-unit optimization system for determining optimal values of said one or more goals and said constraints for operation of each of the at least one component optimization system associated with each of said plurality of power generating units, wherein the multi-unit optimization system includes: (a) a multi-unit model for each of said components, each said multi-unit model receiving input values associated with manipulated variables and disturbance variables and predicting an output value for at least one controlled variable associated with operation of said component, and (b) a multi-unit optimizer for determining optimal setpoint values for at least one of manipulated variables and controlled variables associated with control of the component, said optimal setpoint values determined in accordance with one or more goals associated with operation of the power generating unit and constraints associated with operation of the power generating unit, wherein said optimal setpoint values determined by the multi-unit optimizer for at least one of manipulated variables and controlled variables, are used to determine said one or more goals and said constraints for each of the at least one component optimization system associated with each of said plurality of power generating units.

In accordance with still another aspect of the present invention, there is provided a system for optimizing operation of at least one power generating unit comprised of a plurality of components. The system comprises: a unit optimization system including: (a) a model for each of the plurality of components, each said model receiving input values associated with manipulated variables and disturbance variables and predicting an output value for at least one controlled variable associated with operation of a respective component, and (b) a unit optimizer for determining optimal setpoint values for manipulated variables associated with control of the plurality of components.

In accordance with yet another aspect of the present invention, there is provided a method for optimizing operation of at least one power generating unit comprised of a plurality of components. The method comprises the steps of: (a) providing input values to a plurality of models, wherein each of said plurality of models is a model of a respective component of the at least one power generating unit, said input values associated with manipulated variables and disturbance variables; (b) using each of said plurality of models to predict one or more output values for one or more controlled variables associated with operation of each of said plurality of components; and (c) determining optimal setpoint values for manipulated variables associated with control of each of said plurality of components, said optimal setpoint values determined in accordance with one or more goals and constraints associated with operation of the respective component.

In accordance with yet another aspect of the present invention, there is provided a method for optimizing operation of a plurality of power generating units, each of said plurality of power generating units comprised of a plurality of components. The method comprises the steps of: (a) determining one or more goals and constraints associated with operation of the plurality of power generating units using a multi-unit optimization system; and (b) providing said one or more goals and constraints to at least one component optimization system associated with each of said plurality of power generating units, wherein each component optimization system determines optimal setpoint values for manipulated variables associated with control of an associated component, in accordance with said one or more goals and constraints determined by said multi-unit optimization system.

An advantage of the present invention is the provision of a model-based optimization system for optimizing operation of components of a single power generating unit or a plurality of power generating units.

Another advantage of the present invention is the provision of a multi-component optimization system that includes one or more individual component optimization systems that are coordinated to operate in sequence and feed forward data to subsequent individual optimization systems.

Still another advantage of the present invention is the provision of a unit optimization system that determines goals and constraints for a coordinated multi-component optimization system.

Yet another advantage of the present invention is the provision of a multi-unit optimization system that determines goals and constraints for a plurality of multi-component optimization systems, said plurality of multi-component optimization systems respectively associated with a plurality of power generating units.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DETAILED DESCRIPTION OF THE INVENTION

Figure 1:
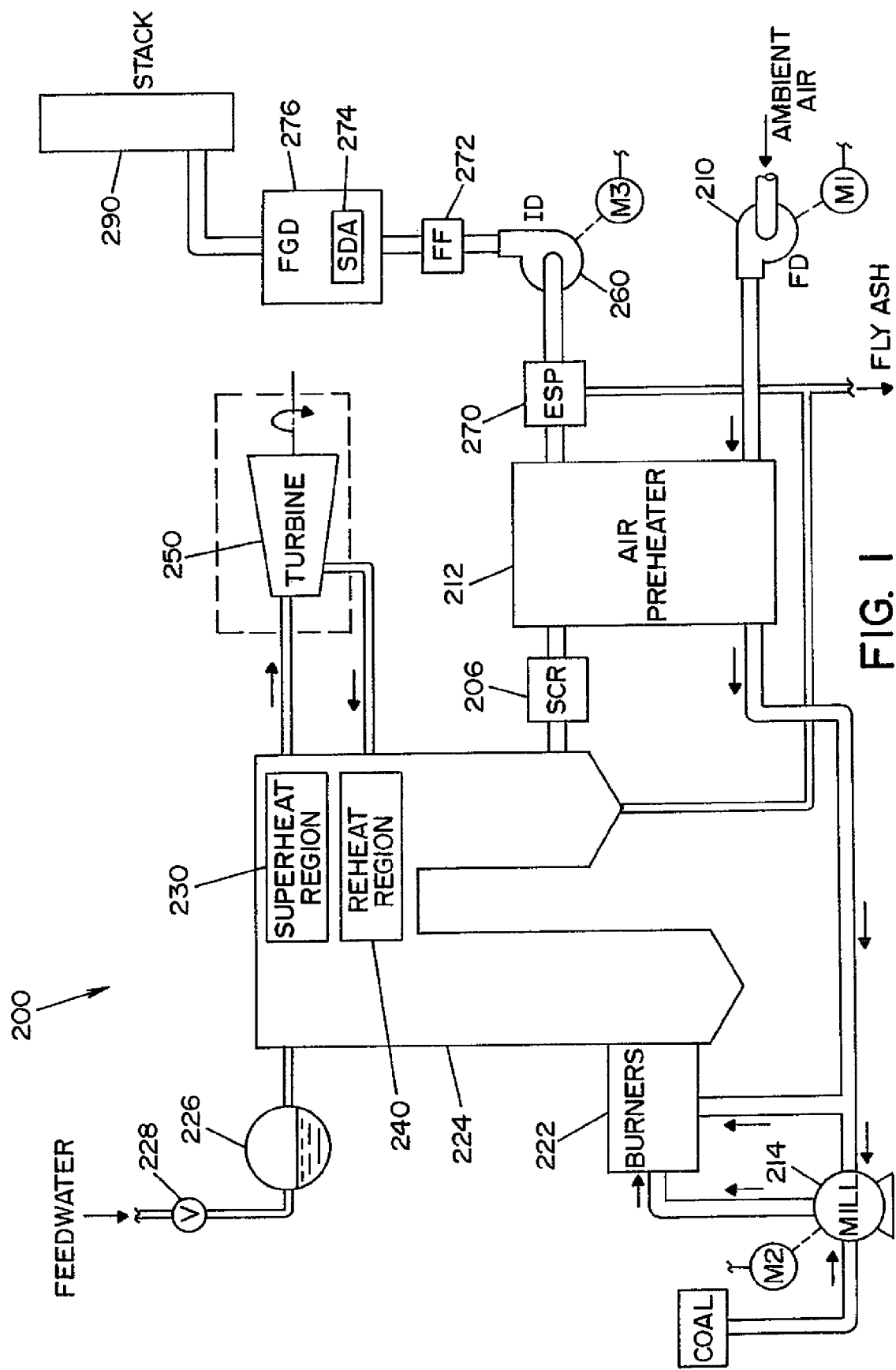
FIG. 1 shows a simplified schematic of a typical coal-fired power generating unit.

It should be understood that the various systems described in the illustrated embodiments of the present invention may take the form of computer hardware, computer software, or combinations thereof. The computer hardware may take the form of a conventional computer system including a processor, data storage devices, input devices (e.g., keyboard, mouse, touch screen and the like), and output devices (e.g., display devices such as monitors and printers), or be embodied as part of another computer system.

Furthermore, the specific inputs and outputs of each model disclosed herein are shown solely for the purpose of illustrated an embodiment of the present invention. In this regard, it is contemplated that the specific model inputs and outputs may vary according to the requirements of the model and the desired predicted values that are being determined by the model.

The present invention is described herein with reference to power generating units for the generation of electric power. However, it is contemplated that the present invention is also applicable to other applications, including, but not limited to, steam generating units for generation of steam.

Power Generating Unit

The main components of a typical fossil fuel power generating unit 200 will now be briefly described with reference to FIG. 1. Power generating unit 200 includes one or more forced draft (FD) fans 210 that are powered by motors M1. Forced draft fans 210 supply air to mills 214 and to burners 222, via an air preheater 212. Ambient air is heated as it passes through air preheater 212. Mills 214 include pulverizers that are powered by motors M2. The pulverizers grind coal (or other fuel) into small particles (i.e., powder). The air received by the mills from forced draft fans 210 is used to dry and carry the coal particles to burners 222. Air from forced draft fans 210 that is supplied to burners 222, via air preheater 212, facilitates combustion of the coal at furnace 224. Hot flue gas is drawn out of furnace 224 by one or more induced draft (ID) fans 260, and delivered to the atmosphere though a chimney or stack 290. Induced draft fans 260 are powered by motors M3. Water is supplied to a drum 226 by control of a feedwater valve 228. The water in drum 226 is heated by furnace 224 to produce steam. This steam is further heated in a superheat region 230 by a superheater (not shown). A superheater spray unit (not shown) can introduce a small amount of water to control the temperature of the superheated steam. A temperature sensor (not shown) provides a signal indicative of the sensed temperature of the superheated steam. Superheated steam produced by power generating unit 200 is supplied to a turbine 250 that is used to produce electricity. Steam received by the turbine is reused by circulating the steam through a reheater (not shown) that reheats the steam in a reheat region 240. A reheater spray unit (not shown) can introduce a small amount of water to control the temperature of the reheated steam. A temperature sensor (not shown) provides a signal indicative of the sensed temperature of the reheated steam.

A "boiler" includes, but is not limited to, burners 222, furnace 224, drum 226, superheater, superheater spray unit, reheater, reheater spray unit, mills 214, and a boiler economizer (not shown). The boiler economizer recovers "waste heat" from the boiler's hot stack gas and transfers this heat to the boiler's feedwater.

Soot cleaning devices (not shown), include, but are not limited to, sootblowers, water lances, and water cannons or hydro-jets. Soot cleaning devices use steam, water or air to dislodge deposits, such as slag, and clean surfaces throughout various locations in the boiler. Soot cleaning is required to maintain performance and efficiency of power generating unit 200. The number of soot cleaning devices on a given power generating unit can range from several to over a hundred. Furthermore, the soot cleaning devices may be grouped together by location (e.g., zones in the boiler). Each group of soot cleaning devices may be comprised of one or more soot cleaning devices. For example, a boiler may have eight (8) soot cleaning device groups, each group comprising five (5) individual soot cleaning devices.

In addition, power generating unit 200 includes some form of post-combustion air pollution control (APC) equipment for removing pollutants from the flue gas. The APC equipment may include, but is not limited to, a selective catalytic reactor (SCR) 206, an electro-static precipitator (ESP) 270, a fabric filter (FF) 272, a spray dry absorber (SDA) 274, and a wet flue gas desulfurization (FGD) system 276.

A selective catalytic reactor (SCR) is used to remove nitrogen oxides (NOx) from the flue gas. Dirty flue gas leaves the boiler and enters the selective catalytic reduction (SCR) system. Prior to entering the SCR, NOx in the inlet flue gas is measured with one or more analyzers. In addition, prior to entering the SCR, the flue gas passes through an ammonia ($NH_3$) injection grid (not shown) located in the ductwork. Ammonia that has been mixed with dilution air is dosed into the flue gas by the injection grid. The NOx laden flue gas, ammonia and dilution air pass into the SCR reactor and over the SCR catalyst. The SCR catalyst promotes the reduction of NOx with ammonia to nitrogen and water. NOx "free" flue gas leaves the SCR reactor and exits the power generating unit via potentially other APC subsystems and the stack.

Additional NOx analyzers are located in the NOx "free" flue gas stream exiting the SCR system or in the stack. The measured NOx outlet value and the measured NOx inlet value are used to calculate a NOx removal efficiency. NOx removal efficiency is defined as the percentage of inlet NOx removed from the flue gas.

In addition, a small amount of unreacted ammonia (i.e., "ammonia slip") is exhausted from the SCR. This ammonia slip can react with other components of the flue gas to form salts that can be deposited, and subsequently foul other system components, such as the air preheater. Thus, to prevent fouling of components, the level of ammonia slip is often constrained.

As the amount of ammonia injected into the flue gas increases, the removal efficiency improves while the ammonia slip increases. Thus, a constraint on ammonia slip indirectly constrains the removal efficiency of the SCR. Because ammonia slip is often not directly measured on-line in real-time, it is typically indirectly controlled by limiting the removal efficiency of the SCR.

An electro-static precipitator (ESP) is the most common approach to removal of particulate matter from the flue gas steam of a power generating unit. In an ESP, particles suspended in the flue gas are electrically charged. An electric field then forces the charged particles to an electrode where they are collected. A rapping system is used to remove the particles from the electrode. The removed particles fall into an ash handle system which is used to dispose of the ash. Using this approach, ESPs can typically achieve 90%-99.5% removal rates of particulate matter.

An ESP is typically comprised of a series of electrical plates with wires between the plates. The wires are used to charge the particles using corona discharge. An electric field for driving the particles is established between the wire and plates. The flue gas flows through a series of electrically separated fields of plates and wires. Each of these fields may be separately powered. The primary motivation for using separate fields is to provide redundancy in the system.

A wet flue gas desulfurization (FGD) is the most common approach to removal of significant amounts of $SO_2$ from the flue gas of power generating units. In a power generating unit, dirty, $SO_2$ laden flue gas is exhausted from a boiler. The $SO_2$ laden flue gas is input into an absorber tower, which is the primary component in an FGD.

The $SO_2$ in the flue gas has a high acid concentration. Accordingly, the absorber tower operates to place the $SO_2$ laden flue gas in contact with a liquid slurry having a higher pH level than that of the flue gas. This is accomplished by spraying the liquid slurry in countercurrent to the flue gas in the absorber tower.

During processing in the countercurrent absorber tower, the $SO_2$ in the flue gas will react with a calcium carbonate-rich slurry (limestone and water) to form calcium sulfite, which is basically a salt and thereby removing the $SO_2$ from the flue gas. The spray, including the $SO_2$ in the form of calcium sulfite, falls into a large tank at the bottom of the absorber. The $SO_2$-cleaned flue gas is exhausted from the absorber tower, either to an exhaust stack or to downstream processing equipment.

A blower pressurizes ambient air to create oxidation air within the absorber tank. The oxidation air is mixed with the slurry in the tank to oxidize the calcium sulfite to calcium sulfate. Each molecule of calcium sulfate binds with two molecules of water to form a compound that is commonly referred to as gypsum. The gypsum is removed from the wet FGD processing unit and sold to, for example, manufacturers of construction grade wallboard. In order to sell the gypsum, it must be of an acceptable purity. The purity is affected by the pH which also affects the removal efficiency.

In FIG. 1, coal is used as the fuel for power generating unit 200. In general, fossil fuel power generating units often use a blend of multiple fuels. For example, most operators of coal-fired power generating units combine various types of coals to achieve a desired blend that is burned in the furnace. Typically, several different types of coal are stocked in the coal yard at a power generating plant. These different coals may come from the same mine or from a variety of mines. If these coals are from the same mine, they may come from different seams or different locations in the mine. Thus, each of the coals at the power generating plant may have different costs, availability, and coal characteristics including heat, sulfur, nitrogen and ash content. Typically, the different coals are blended together by an operator often using "rules of thumb" to supply the furnace with a desired blend of coal. In addition, fuel additives may be introduced into the blend to improve heat rate or provide desired fuel characteristics.

It should be understood that a typical power generating unit also includes additional components well known to those skilled in the art, including, but not limited to, tubes for carrying fluids, valves, dampers, windbox, sensing devices for sensing a wide variety of system parameters (e.g., temperature, pressure, flow rate, and flue gas components), and actuators for actuating components such as valves and dampers.

Optimization System

Figure 2:
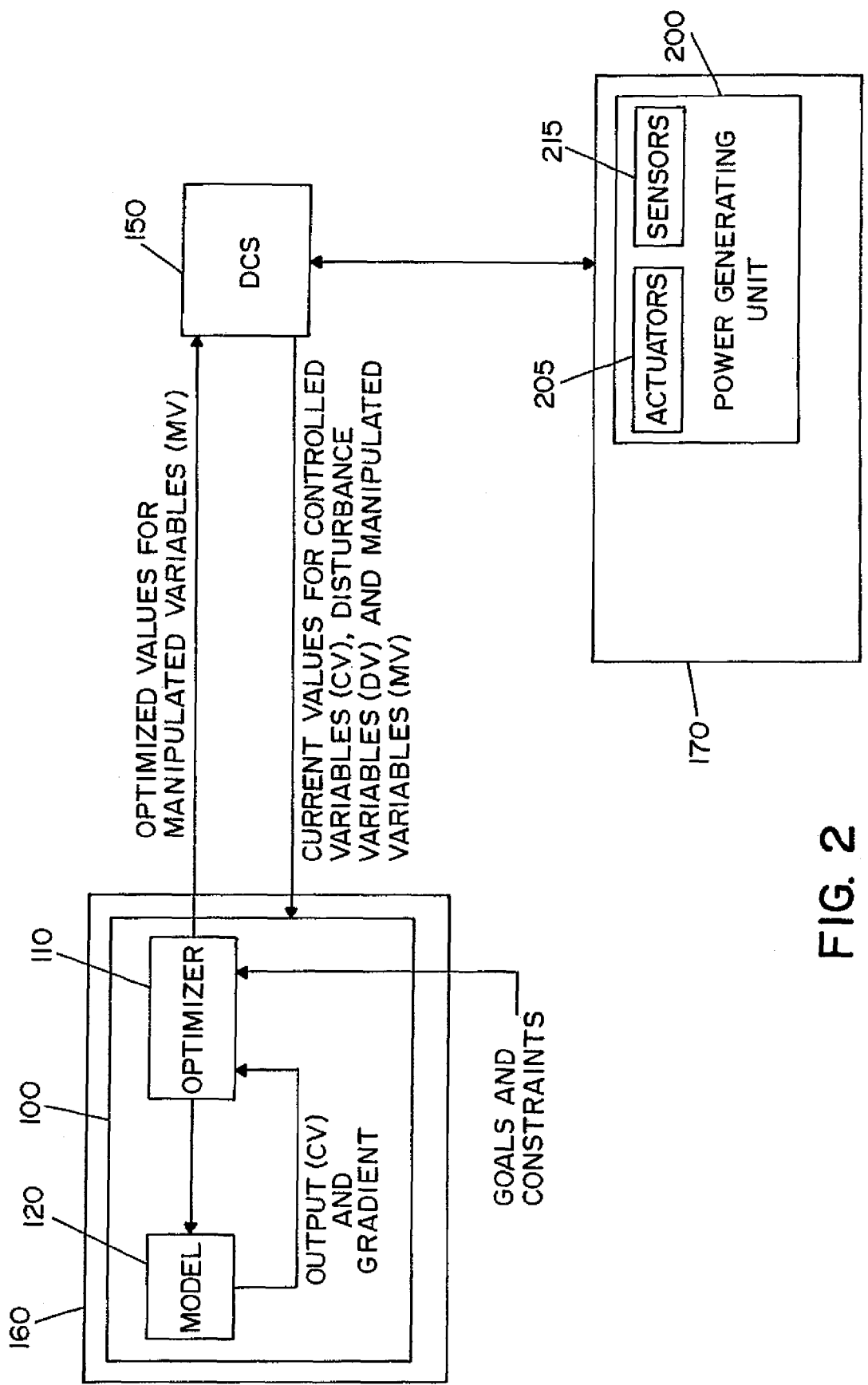
FIG. 2 illustrates an optimization system connected with a distributed control system (DCS) for controlling operation of a power generating plant.

FIG. 2 illustrates a block diagram of an optimization system 100. In the illustrated embodiment, optimization system 100 is comprised of an optimizer 110 and a model 120. Optimizer 110 and model 120 are both described in greater detail below. In accordance with an illustrated embodiment, optimization system 100 may form part of a supervisory controller 160 that communicates with a DCS 150. DCS 150 is a computer-based control system that provides regulatory control of a power generating plant 170. DCS 150 may take the form of a programmable logic controller (PLC). Supervisory controller 160 is a computer system that provides supervisory control data to DCS 150. It should be understood that in an alternative embodiment, model 120 may reside on a different computer system than optimizer 110.

An operator interface (not shown) provides means for an operator to communicate with DCS 150. DCS 150 may also communicate with a historian (not shown).

Plant 170 includes one or more power generating units 200. Each power generating unit 200 includes a plurality of actuators 205 and sensors 215. Actuators 205 includes devices for actuating components such as valves and dampers. Sensors 215 include devices for sensing various system parameters (e.g., temperature, pressure, flow rate, and flue gas components).

Model 120 is used to represent the relationship between (a) manipulated variables (MV) and disturbance variables (DV) and (b) controlled variables (CV). Manipulated variables (MVs) may be changed by the operator or optimization system 100 to affect the controlled variables (CVs). As used herein, disturbance variables refer to variables (associated with power generating unit 200) that affect the controlled variables, but cannot be manipulated by an operator (e.g., ambient conditions, characteristics of the coal, etc.). Optimizer 110 determines an optimal set of setpoint values for the manipulated variables given (1) a desired goal associated with operation of the power generating unit (e.g., minimizing NOx production) and (2) constraints associated with operation of the power generating unit (e.g., limits on emissions of NOx, $SO_2$, $CO_2$, CO, mercury, ammonia slip and particulate matter).

At a predetermined frequency (e.g., every 10-30 seconds), optimization system 100 obtains the current values of manipulated variables, controlled variables and disturbance variables from DCS 150. An "optimization cycle" commences each time the current values for the manipulated variables, controlled variables and disturbance variables are read out from DCS 150.

As will be described in further detail below, optimization system 100 uses model 120 to determine an optimal set of setpoint values for the manipulated variables based upon current conditions of power generating unit 200. The optimal set of setpoint values are sent to DCS 150. An operator of plant 170 has the option of using the optimal set of setpoint values for the manipulated variables. In most cases, the operator allows the computed optimal set of setpoint values for the manipulated variables to be used as setpoints values for control loops. Optimization system 100 runs in a closed loop adjusting the setpoints values of the manipulated variables at a predetermined frequency (e.g., every 10-30 seconds) depending upon current operating conditions of power generating unit 200.

Neural Network Based Dynamic Model

To properly capture the relationship between the manipulated/disturbance variables and the controlled variables, model 120 may have the following characteristics:

Nonlinearity: A nonlinear model is capable of representing a curve rather than a straight line relationship between manipulated/disturbance and controlled variables. For example, a nonlinear, curved relationship is often observed between over-fire air dampers and NOx.

Multiple Input Multiple Output (MIMO): The model must be capable of capturing the relationships between multiple inputs (manipulated/disturbance variables) and multiple outputs (controlled variables).

Dynamic: Changes in the inputs do not instantaneously affect the outputs. Rather there is a time delay and follow by a dynamic response to the changes. It may take 15-30 minutes for changes in the inputs to fully propagate through the system. Since optimization systems execute at a predetermined frequency (e.g., an optimization cycle commencing every 10-30 seconds), the model must represent the effects of these changes over time and take them into account.

Adaptive: The model must be updated at the beginning of each optimization cycle (e.g., every 10-30 seconds) to reflect the current operating conditions of the boiler.

Derived from Empirical Data: Since each boiler is unique, the model must be derived from empirical data obtained from the power generating unit.

Given the foregoing requirements, a neural network based approach is presently the preferred technology for implementing models in accordance with the present invention. Neural networks are developed based upon empirical data using advanced regression algorithms. See, for example, C. Bishop, *Neural Networks for Pattern Recognition*, Clarendon Press, Oxford, U.K., 1995, fully incorporated herein by reference. Neural networks are capable of capturing the nonlinearity commonly exhibited by boilers. Neural networks can also be used to represent systems with multiple inputs and outputs. In addition, neural networks can be updated using either feedback biasing or on-line adaptive learning.

Dynamic models can also be implemented in a neural network based structure. A variety of different types of model architectures have been used for implementation of dynamic neural networks, as described in S. Piche, "Steepest Descent Algorithms for Neural Network Controllers and Filters," *IEEE Trans. Neural Networks*, vol. 5, no. 2, pp. 198-212, 1994 and A. Barto, "Connectionist Learning for Control," Neural Networks for Control, edited by Miller, W., Sutton, R. and Werbos, P., MIT Press, pp 5-58, 1990, both of which are fully incorporated herein by reference. Many of the neural network model architectures require a large amount of data to successfully train the dynamic neural network. A novel neural network structure, which may be trained using a relatively small amount of data, was developed in the late 1990's. Complete details on this dynamic neural network based structure are provided in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

Given a model of a boiler, it is possible to compute the effects of changes in the manipulated variables on the controlled variables. Furthermore, since the model is dynamic, it is possible to compute the effects of changes in the manipulated variables over a future time horizon (i.e., multiple changes rather than a single change).

Given that a relationship between inputs and outputs is well represented by the model described above, it will now be described how setpoint values for inputs (i.e., manipulated variables) can be determined to achieve desired goals while also observing the constraints.

Optimizer

An optimizer is used to minimize a "cost function" subject to a set of constraints. The cost function is a mathematical representation of a desired goal or goals. For instance, to minimize NOx, the cost function includes a term that decreases as the level of NOx decreases. One common method for minimizing a cost function is known as "gradient descent optimization." Gradient descent is an optimization algorithm that approaches a local minimum of a function by taking steps proportional to the negative of the gradient (or the approximate gradient) of the function at the current point.

Since the model is dynamic, the effects of changes must be taken into account over a future time horizon. Therefore, the cost function includes terms over a future horizon, typically one hour for "combustion" optimization. Since the model is used to predict over a time horizon, this approach is commonly referred to as model predictive control (MPC). Model Predictive Control is described in detail in S. Piche, B. Sayyar-Rodsari, D. Johnson and M. Gerules, "Nonlinear model predictive control using neural networks," *IEEE Control Systems Magazine,* vol. 20, no. 2, pp. 53-62, 2000, which is fully incorporated herein by reference.

Constraints may be placed upon both the inputs (Mvs) and outputs (CVs) of the boiler over the future time horizon. Typically, constraints that are consistent with limits associated with the UCS are placed upon the manipulated variables. Constraints on the outputs (CVs) are determined by the problem that is being solved.

A nonlinear model can be used to determine the relationship between the inputs and outputs of a boiler. Accordingly, a nonlinear programming optimizer is used to solve the optimization problem in accordance with this embodiment of the present invention. However, it should be understood that a number of different optimization techniques may be used depending on the form of the model and the costs and constraints. For example, it is contemplated that the present invention may be implemented by using, individually or in combination, a variety of different types of optimization approaches. These optimization approaches include, but not limited to, linear programming, quadratic programming, mixed integer non-linear programming (NLP), stochastic programming, global non-linear programming, genetic algorithms, and particle/swarm techniques.

Given the cost function and constraints, a non-linear program (NLP) optimizer typically solves problems with 20 manipulated variables and 10 controlled variables in less than one second. This is sufficiently fast for most applications since the optimization cycle is typically in the range of 10-30 seconds. More details on the formulation of the cost function and constraints are provided in the above mentioned reference S. Piche, B. Sayyar-Rodsari, D. Johnson and M. Gerules, "Nonlinear model predictive control using neural networks," *IEEE Control Systems Magazine,* vol. 20, no. 2, pp. 53-62, 2000, which is fully incorporated herein by reference.

The optimizer computes the full trajectory of manipulated variable moves over the future time horizon, typically one hour. For an optimization system that executes every 30 seconds, 120 values are computed over a one hour future time horizon for each manipulated variable. Since the model or goals/constraints may change before the next optimization cycle, only the first value in the time horizon for each manipulated variable is output by the optimization system to the DCS as a setpoint value for each respective manipulated variable.

At the next optimization cycle, typically 30 seconds later, the model is updated based upon the current conditions of the boiler. The cost function and constraints are also updated if they have changed. Typically, the cost function and constraints are not changed. The optimizer is used to recompute the set of values for the manipulated variables over the time horizon and the first value in the time horizon, for each manipulated variable, is output to the DCS as the setpoint value for each respective manipulated variable. The optimization system repeats this process for each optimization cycle (e.g., every 30 second), thus, constantly maintaining optimal performance as the boiler is affected by changes in such items as load, ambient conditions, boiler conditions, and fuel characteristics.

Applications of Optimization Systems for Power Generating Unit Components

The optimization system described above can be used to optimize several different components of a power generating unit, including, but not limited to, fuel distribution equipment, boiler (combustion), SCR, ESP and FGD. Optimization of each of these unit components is described below.

It should be understood that while various embodiments of the present invention will be described herein with reference to models in the form of neural network based models, it is contemplated that the present invention may be implemented using other types of models, including but not limited to, an empirically developed model, a model developed using "first principles" knowledge (i.e., a model that is developed using known physical equations), a support vector machine (SVM) model, a model developed by linear regression, or a model based upon heuristics.

Furthermore, in accordance with the present invention, a model that represents the steady state (i.e., a "steady state model") or a model that represents both the steady state and dynamics (i.e., a "dynamic model"), may be used. If a steady state model is used, a steady state optimization is performed typically once every 15 minutes for the applications disclosed herein. If a dynamic model is used, dynamic optimization (model predictive control) is performed typically at a frequency of once every 15-30 seconds for the applications disclosed herein. However, the frequency for steady state and dynamic optimization may vary in accordance with the particular application.

It should be appreciated that specific manipulated variables, disturbance variables and controlled variables are disclosed herein solely for the purpose of illustrating embodiments of the present invention, and are not intended to limit the scope of the present invention. In this regard, other manipulated variables, disturbance variables and controlled variables, not disclosed herein, may also be used in implementation of the present invention.

Fuel Blending Optimization System

Figure 3:
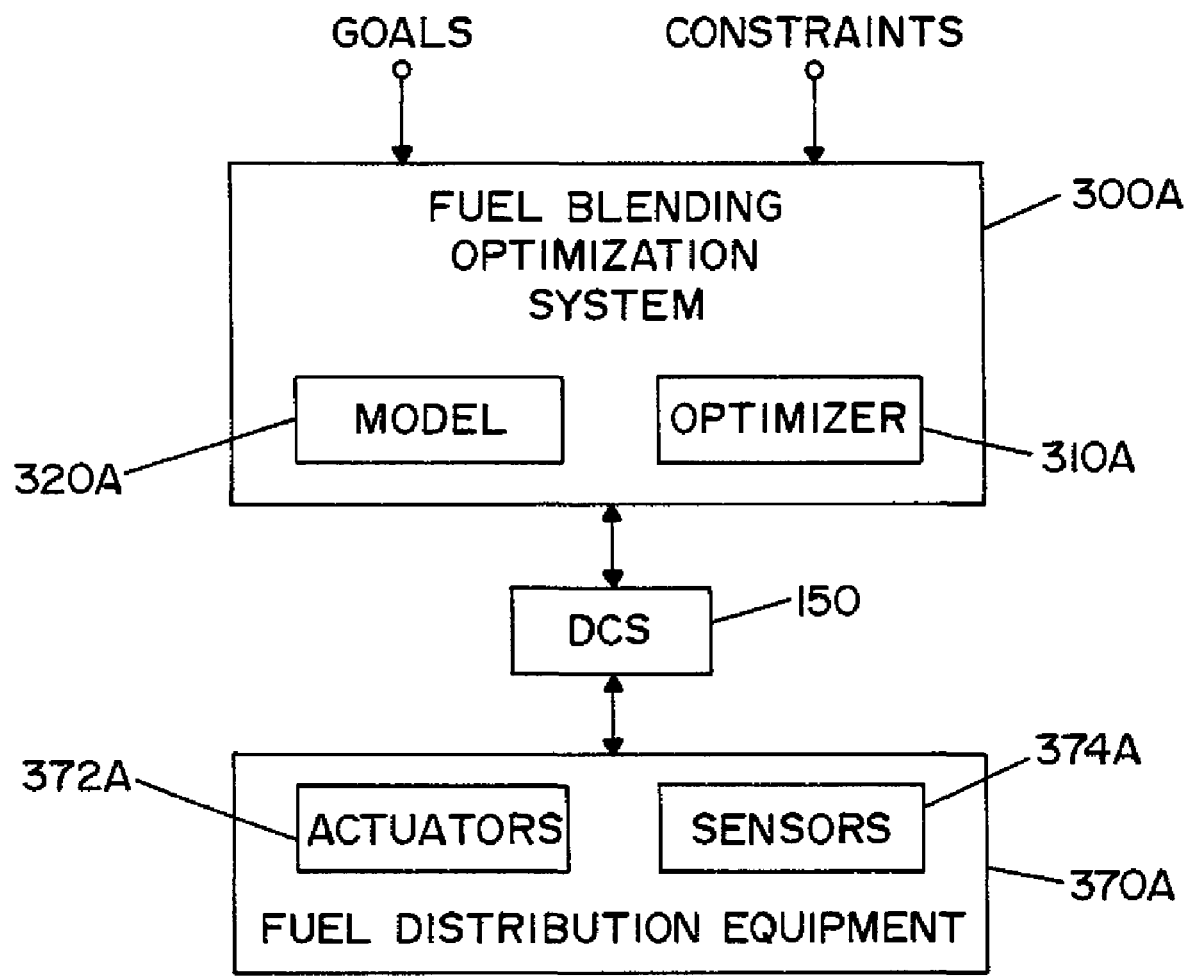
FIG. 3 illustrates a fuel blending optimization system.

FIG. 3 shows a fuel blending optimization system 300A. Fuel blending optimization system 300A communicates with a DCS 150 to control fuel distribution equipment 370A to achieve the desired blend of fuel, based upon constraints and goals specified by an operator or an engineer. Fuel Blending Optimization System 300A includes a fuel blending model 320A and an optimizer 310A. Fuel distribution equipment 370A includes feeder and conveyer belts, as well as activators 372A and sensors 374A. DCS 150 communicates current values of the manipulated, disturbance and controlled variables to fuel blending optimization system 300A.

Figure 4:
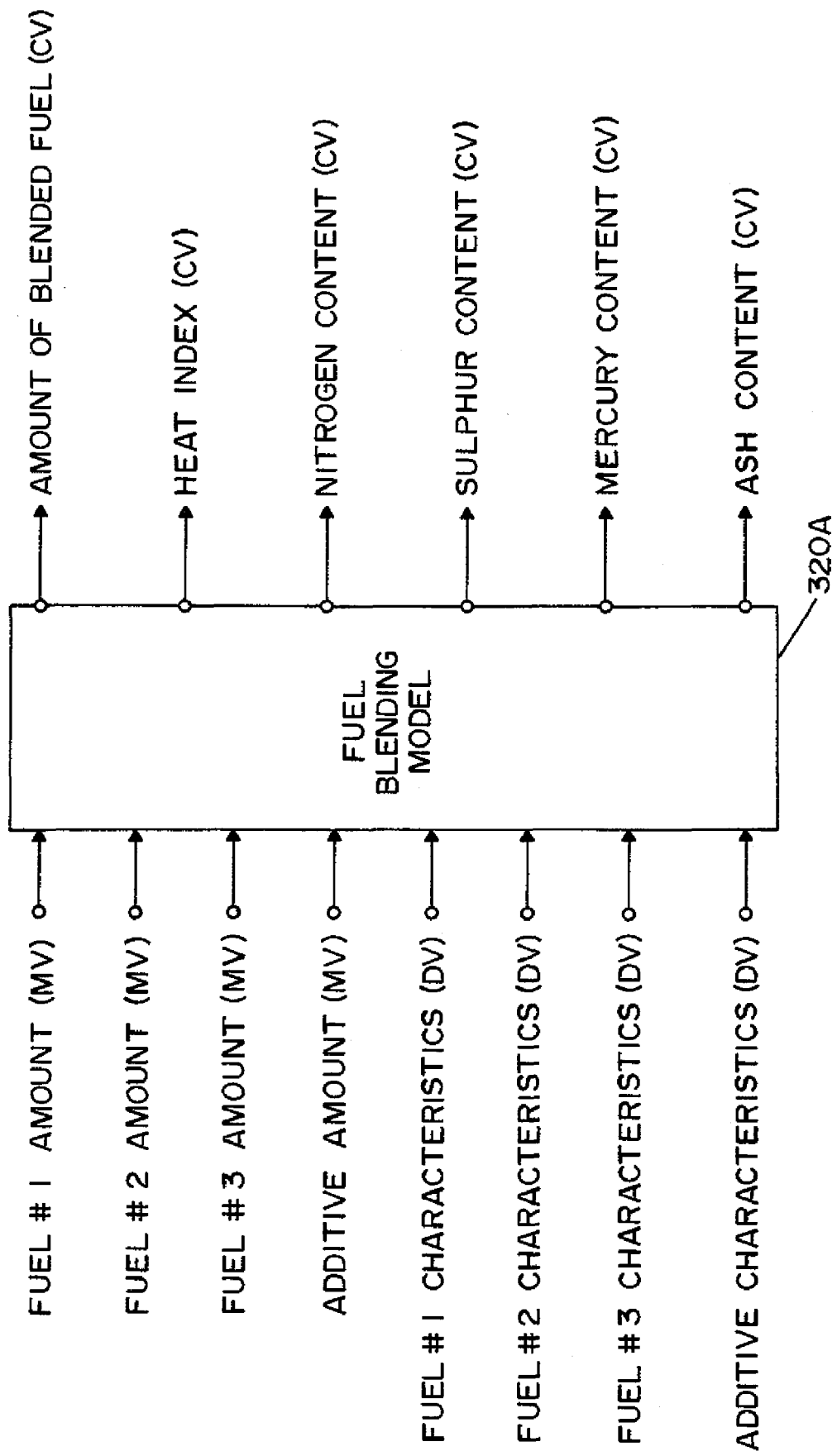
FIG. 4 illustrates an embodiment of a fuel blending model used in the fuel blending optimization system shown in FIG. 3.

Fuel Blending Optimization System 300A uses model 320A, optimizer 310A, and goals and constraints, as described above. FIG. 4 shows an embodiment of model 320A used in fuel blending optimization system 300A.

By way of example, and not limitation, the manipulated variable (MV) inputs to model 320A may include the amounts of the various types of fuels and additives. In the embodiment of model 320A illustrated in FIG. 4, model 320A includes three types of fuels and an additive. The disturbance variable (DV) inputs to model 320A may typically include such fuel characteristics as heat index, nitrogen content, sulfur content, mercury content, and ash content. In addition, characteristics of the additive may also be included as a disturbance variable. The controlled variable (CV) outputs of model 320A include blended fuel characteristics, such as the amount of blended fuel, heat index of the blended fuel, as well as the nitrogen, sulfur, mercury and ash contents of the blended fuel.

Optimizer 310A uses model 320A of FIG. 4, along with the goals and constraints, in order to determine the optimal blend of fuel. The goals are expressed in the form of a cost function. The cost function may be used to control the amount of blended fuel to a desired setpoint value. It may also be used to make trade-offs between the cost of the fuel and additive, and the desired characteristics of the blended fuel. Availability of a certain fuel may be used to determine constraints on the manipulated variables. In addition, load may place constraints upon the heat index of the blended fuel. Finally, boiler and environmental consideration may place additional constraints upon characteristics of the blended fuel, such as nitrogen, mercury, sulfur and ash content.

Combustion Optimization System

Figure 5:
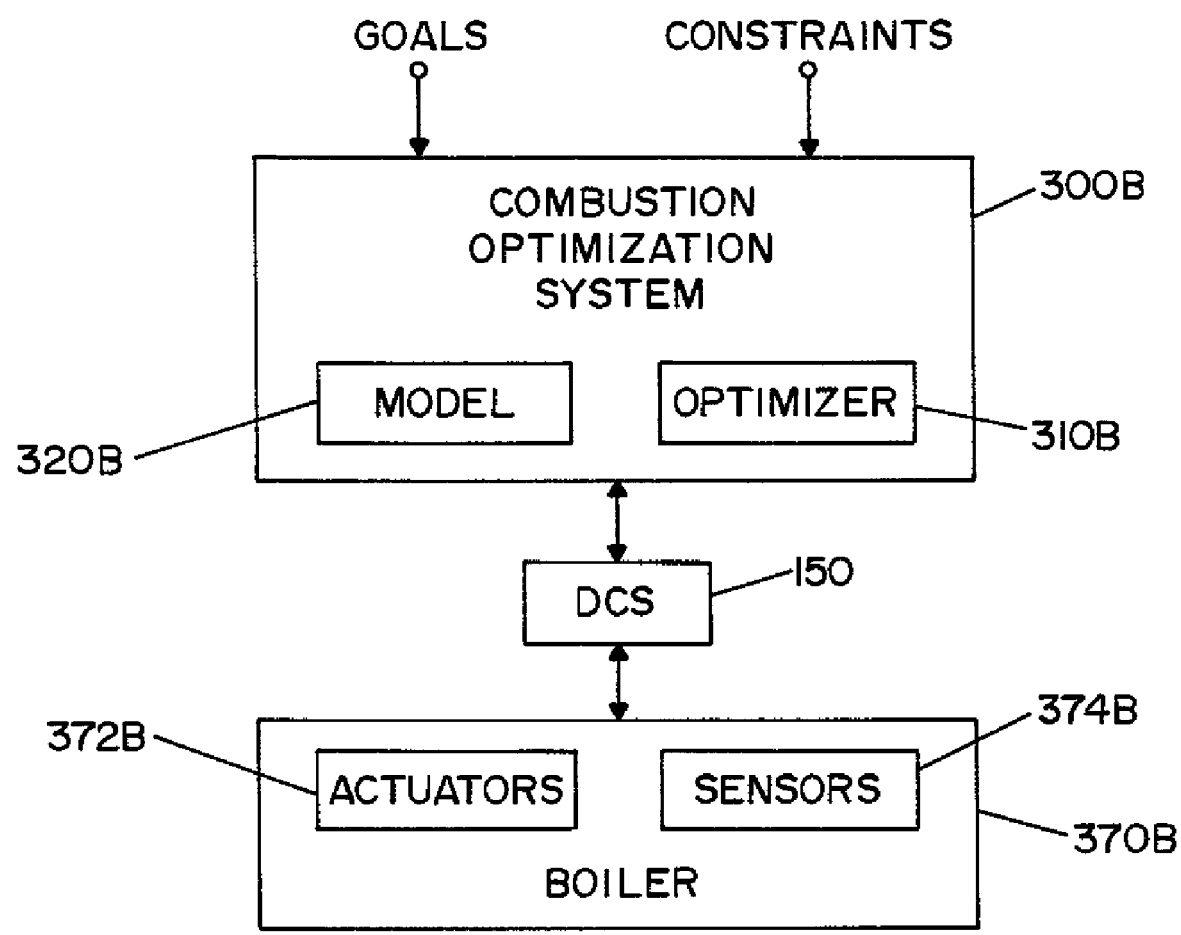
FIG. 5 illustrates a combustion optimization system.

FIG. 5 shows a combustion optimization system 300B. Combustion optimization system 300B communicates with a DCS 150 to control a boiler to achieve the desired combustion characteristics, based upon constraints and goals specified by an operator or an engineer. Combustion optimization system 300B includes a boiler model 320B and an optimizer 310B. Boiler 3701B includes the components discussed above, as well as activators 372B and sensors 374B. DCS 150 communicates current values of the manipulated, disturbance, and controlled variables to combustion optimization system 300B.

Figure 6:
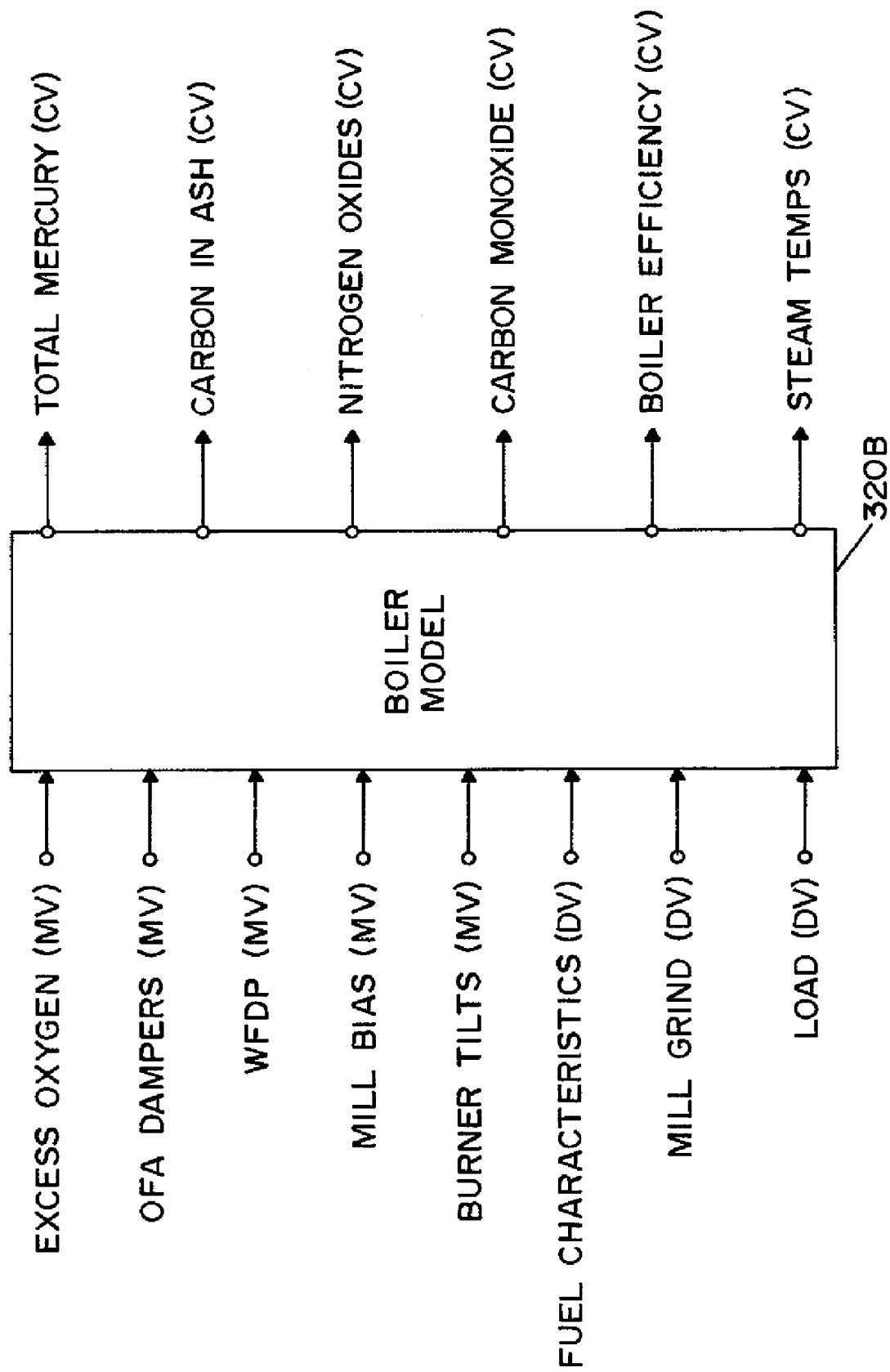
FIG. 6 illustrates an embodiment of a boiler model used in the combustion optimization system shown in FIG. 5.

Combustion optimization system 300B uses model 320B, optimizer 310B, goals and constraints as described above. FIG. 6 shows an embodiment of model 320B used in combustion optimization system 300B.

By way of example, and not limitation, the manipulated variable (MV) inputs to model 320B may include the following: level of excess oxygen in the flue gas, the over-fire air (OFA) damper positions, the windbox-to-furnace differential pressure (WFDP), biases to each of the mills, and the burner tilt angles. The disturbance variable (DV) inputs to model 320B may typically include the following: fuel characteristics (such as ash content and BTU content of the coal), fineness of the mill grind, and load demand. The above-identified manipulated variables and disturbance variables for illustrated model 320B will now be briefly described.

"Excess oxygen" refers to the percentage amount of excess oxygen introduced into the furnace above that required for full combustion of the fuel. As the amount of excess oxygen increases, the boiler operates in an air rich environment. Oxidized mercury is reduced by increasing the amount of excess oxygen.

With respect to "over-fire air (OFA) damper positions," over-fire air is introduced above the combustion zone in a furnace in order to reduce CO emissions and lower NOx emissions. The amount of over-fire air is controlled by the position of a damper.

The "windbox to furnace differential pressure (WFDP)" controls the rate of secondary air entry into the boiler. (The primary air is used to transport the coal into the furnace through the burner.) The secondary air often affects the location of the combustion within the furnace.

With respect to "mill bias," mills are used to grind the coal before the primary air transports the coal dust into the furnace through the burner. The amount of coal ground by each mill is determined primarily by load. However, it is possible to bias the amount of coal such that more or less coal is introduced at various levels. This can be used to incrementally affect the staging of combustion.

As to "coal characteristic," the chemical composition of coal changes even if it is extracted from the same mine. Changes in nitrogen, sulfur, mercury and BTU content are common.

With respect to "mill grind," as described above, mills are used to grind the coal into a fine dust that can be injected into a furnace. The fineness of the grind changes over time as the mill wears.

The term "load" refers to the required electrical power generation rate for a power generating unit.

Model 320B is used to predict the effects of changes in the manipulated and disturbance variables on the output of the boiler. FIG. 6 illustrates one embodiment of the potential set of controlled variable (CV) outputs of model 320B. In this embodiment, model 320B is used to predict emissions from the power generating unit (i.e., total mercury, nitrogen oxides, and carbon monoxide), the amount of carbon in the ash (CIA), boiler efficiency, and steam temperatures (i.e., main, superheat and reheat temperatures).

Optimizer 310B uses model 320B of FIG. 6, along with the goals and constraints, in order to determine optimal combustion. The goals are expressed in the form of a cost function. In one embodiment, the cost function may be used to minimize the amount of emissions (such as NOx and mercury), while observing constraints on variables such as CO, CIA or both CO and CIA. In addition, the cost function may also be used to make trade-offs between boiler efficiency and emissions. Also, the cost function may be used to maintain steam temperatures at desired set-points. Finally, boiler and environmental consideration may place additional constraints upon the manipulated variables, such as a lower limit on the allowed excess oxygen. Using the foregoing approach, combustion optimization system 300B can be used to determine the optimal setpoint values of manipulated variables, based upon current operating conditions and the desires of operators and engineers.

In addition to the embodiment described above, U.S. patent application Ser. No. 10/985,705 (filed Nov. 10, 2004), entitled "System for Optimizing a Combustion Heating Process" (fully incorporated herein by reference) discloses a combustion optimization approach to modeling controllable losses in a power generating unit, and a method for optimizing the combustion process based upon these controllable losses. Also, optimization of sootblowing can be included in a combustion optimization as described in the U.S. patent application Ser. No. 11/053,734 (filed Feb. 8, 2005), entitled "Method and Apparatus for Optimizing Operation of a Power Generation Plant Using Artificial Intelligence Techniques" (fully incorporated herein by reference). Finally, U.S. patent application Ser. No. 11/301,034 (filed Dec. 12, 2005), entitled "Model Based Control and Estimation of Mercury Emissions" (fully incorporated herein by reference) discloses a combustion optimization system and a method for reducing mercury emissions from a coal-fired power plant, while observing limits on the amount of carbon in the fly ash produced by the combustion process.

Selective Catalytic Reduction (SCR) Optimization System

Figure 7:
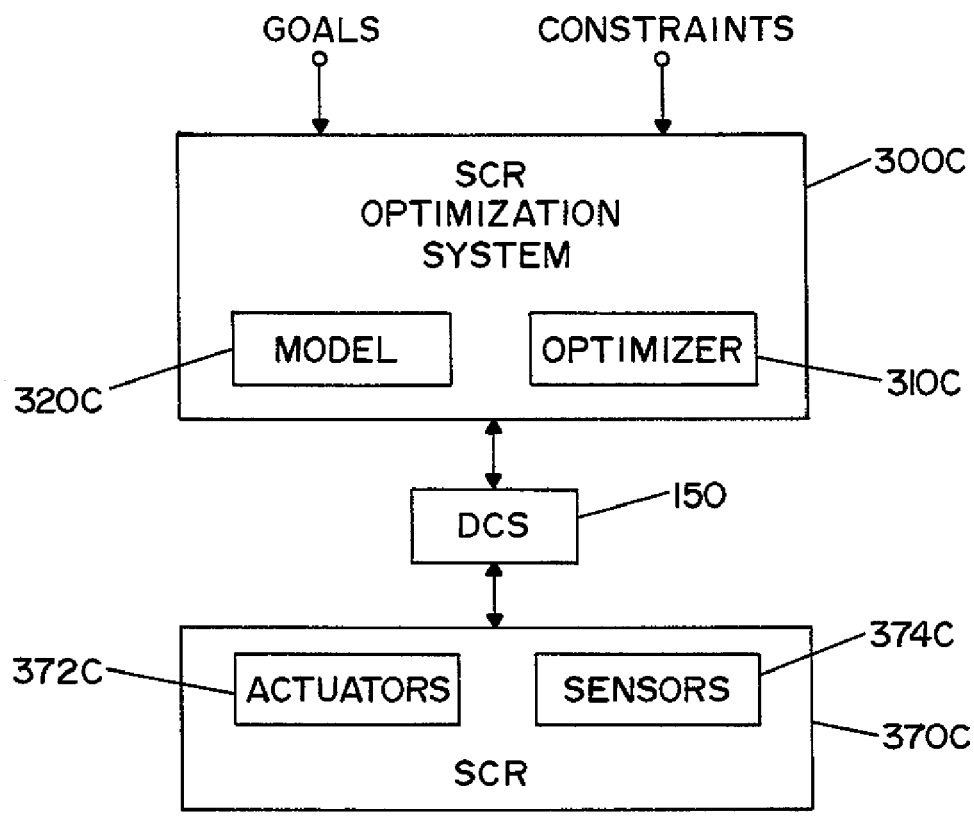
FIG. 7 illustrates an SCR optimization system.

FIG. 7 shows a selective catalytic reduction (SCR) optimization system 300C. SCR optimization system 300C communicates with a DCS 150 to control an SCR 370C to achieve the desired SCR performance based upon constraints and goals specified by an operator or an engineer. SCR Optimization System 300C includes a SCR model 320C and an optimizer 310C. SCR 370C includes actuators 372C and sensors 374C.

DCS 150 communicates current values of the manipulated, disturbance and controlled variables to SCR Optimization System 300C.

Figure 8:
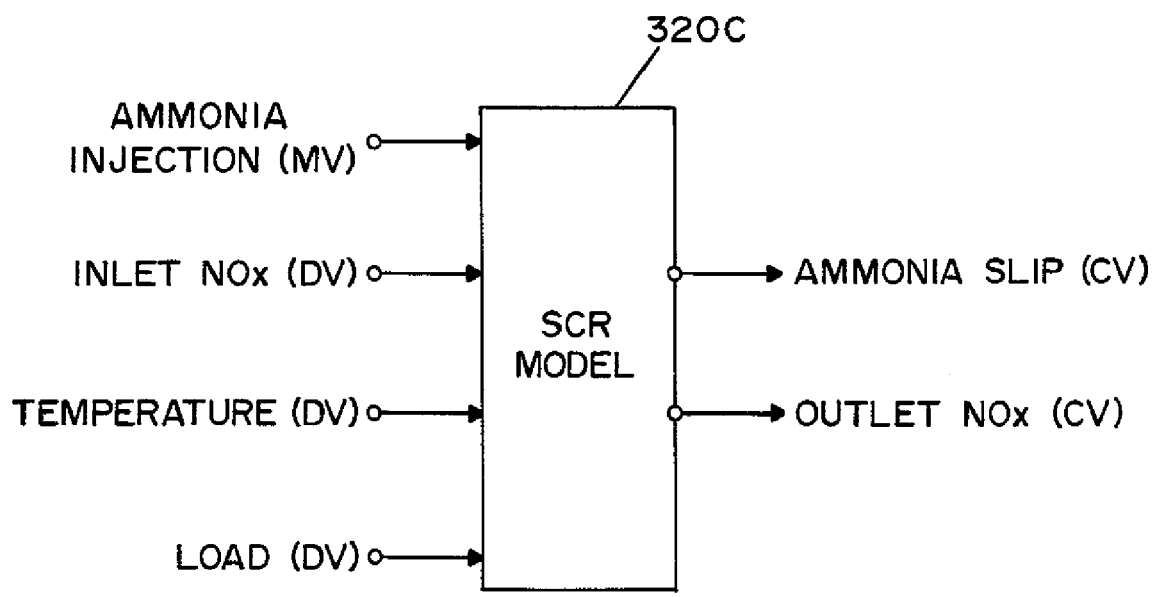
FIG. 8 illustrates an embodiment of an SCR model used in the SCR optimization system shown in FIG. 7.

SCR optimization system 300C uses model 320C, optimizer 310C, goals (cost function) and constraints, as described above. FIG. 8 shows an embodiment of model 320C used in SCR Optimization System 300C.

In the illustrated embodiment, the single manipulated variable (MV) input to model 320C of FIG. 8 is the amount of ammonia injection. The disturbance variable (DV) inputs to model 320C may typically include the following: inlet NOx amount, flue gas temperature, and load. As shown in FIG. 8, the typical controlled variable (CV) output variables of model 320C are ammonia slip and outlet NOx of SCR 370.

Optimizer 310C of FIG. 7 uses model 320C of FIG. 8, along with the goals and constraints, to determine optimal operation of SCR 370C. The goals are expressed in the form of a cost function. In one embodiment, the cost function may be used to minimize outlet NOx while observing constraints on ammonia slip. Using foregoing approach, SCR Optimization System 300C can be used to determine the optimal ammonia injection rate based upon current operating conditions and the desires of operators and engineers. U.S. patent application Ser. No. 10/927,229 (filed Aug. 27, 2004), entitled "Optimized Air Pollution Control" (fully incorporated herein by reference) discloses further details on a variety of different approaches to SCR optimization.

Electro-Static Precipitator (ESP) Optimization System

Figure 9:
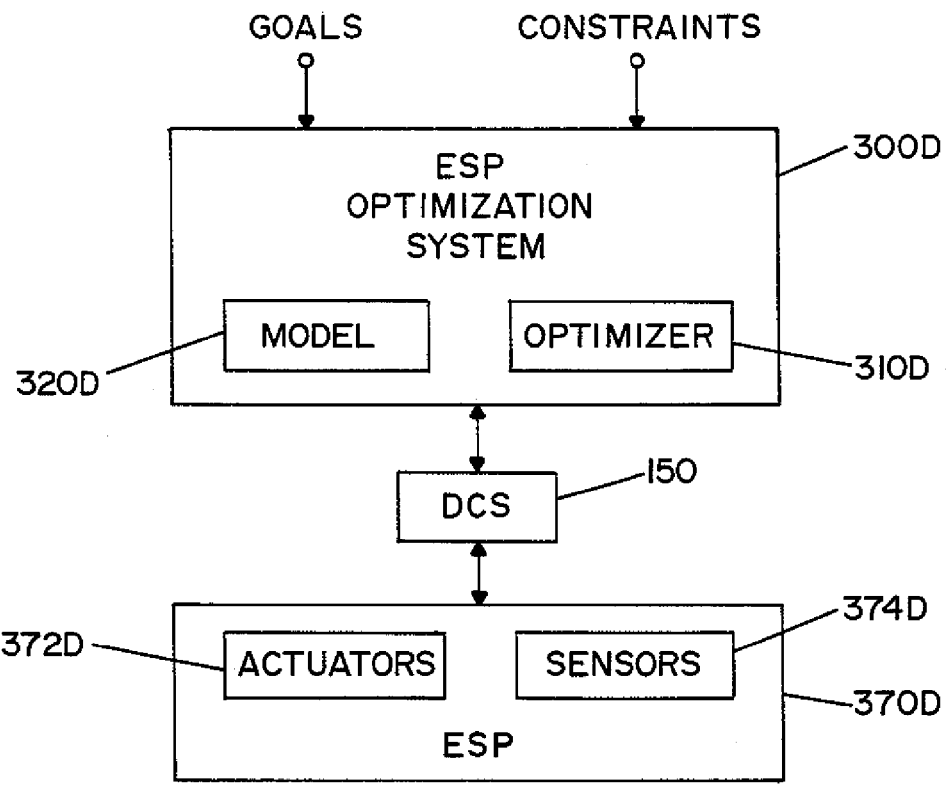
FIG. 9 illustrates an ESP optimization system.

FIG. 9 shows an electro-static precipitator (ESP) optimization system 300D. ESP optimization system 300D communicates with a DCS 150 to control an ESP 370D to achieve the desired operating characteristics constraints and goals specified by an operator or an engineer. ESP optimization system 300D includes an ESP model 320D and an optimizer 310D. ESP 370D includes actuators 372D and sensors 374D. DCS 150 communicates current values of the manipulated, disturbance and controlled variables to ESP optimization system 300D.

Figure 10:
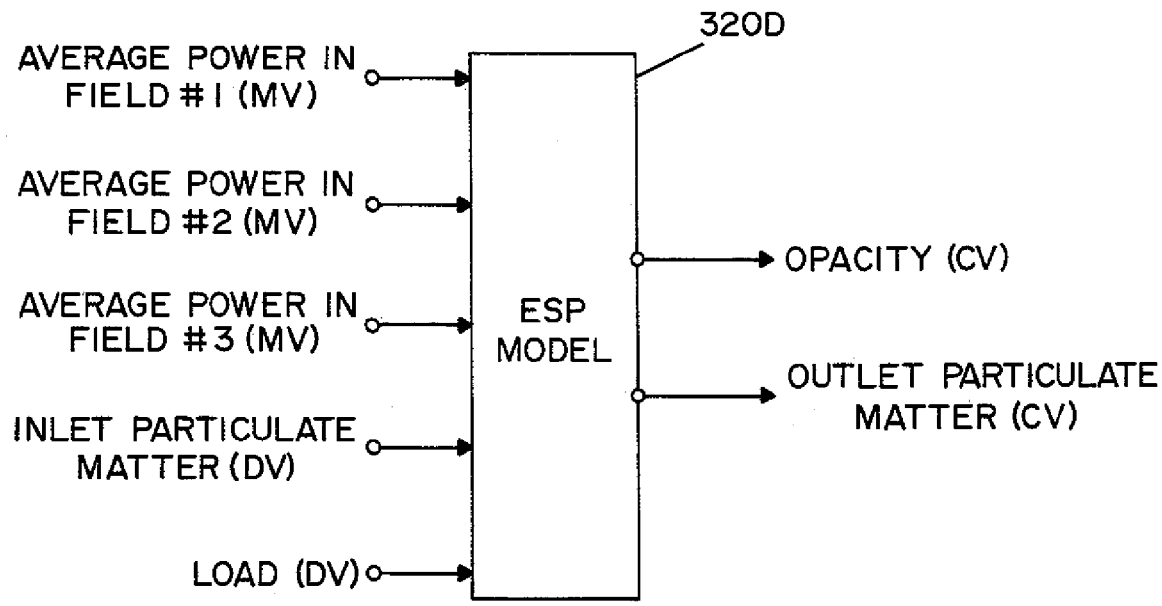
FIG. 10 illustrates an embodiment of an ESP model used in the ESP optimization system shown in FIG. 9.

ESP Optimization System 300D uses model 320D, optimizer 310D, goals (cost function) and constraints, as described above. FIG. 10 shows an embodiment of model 320D used in ESP optimization system 300D.

In the illustrated embodiment, the manipulated variable (MV) inputs to model 320D of FIG. 10 include the average power to be used in each field of ESP 370D. The disturbance variable (DV) inputs to model 320D may typically include the following: inlet particulate matter and load. As shown in FIG. 10, the typical controlled variable (CV) outputs of model 320D are opacity and outlet particulate matter.

Optimizer 310D of FIG. 9 uses model 320D of FIG. 10, along with the goals and constraints, to determine optimal operation of ESP 370D. The goals are expressed in the form of a cost function. In one embodiment, the cost function may be used to minimize power consumption in the fields of ESP 370D, while observing limits on opacity and outlet particulate matter. Using the foregoing approach, ESP optimization system 300D can be used to determine the optimal power consumption based upon current operating conditions and the desires of operators and engineers.

Flue Gas Desulfurization (FGD) Optimization System

Figure 11:
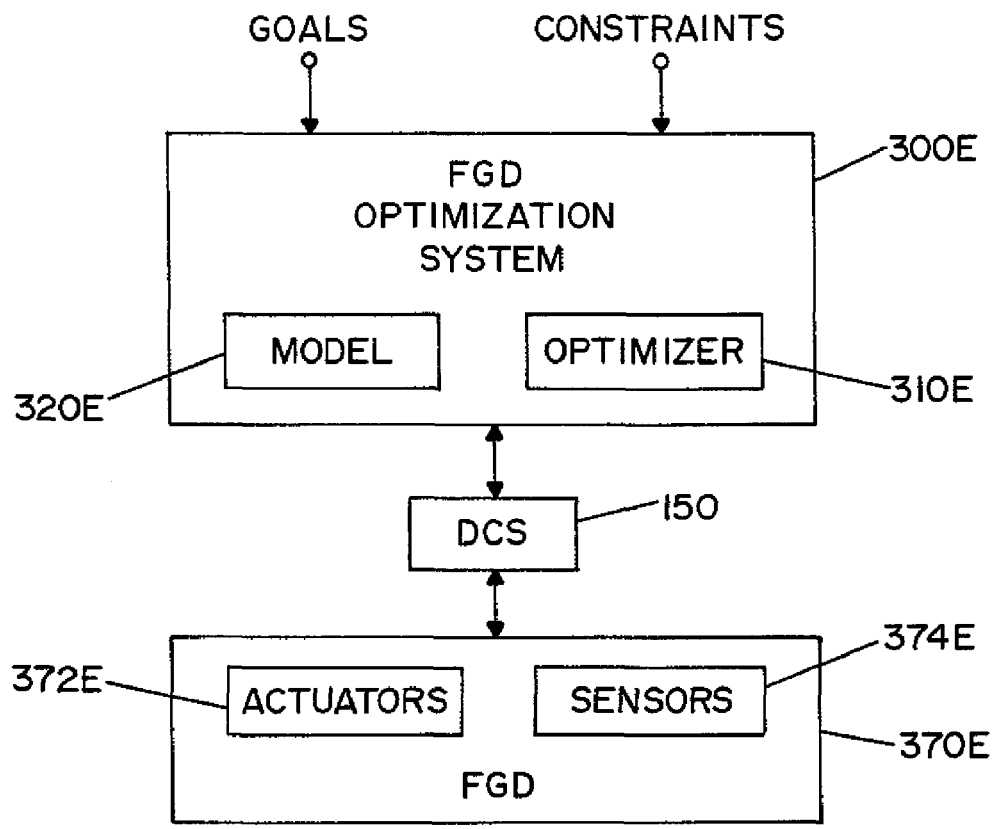
FIG. 11 illustrates a wet FGD optimization system.

FIG. 11 shows a wet flue gas desulfurization (FGD) optimization system 300E. FGD optimization system 300E communicates with a DCS 150 to control an FGD 370E to achieve the desired operating characteristics based upon goals and constraints specified by an operator or an engineer. FGD Optimization System 300E includes an FGD model 320E and an optimizer 310E. FGD 370E includes actuators 372E and sensors 374E. DCS 150 communicates current values of the manipulated, disturbance and controlled variables to FGD optimization system 300E.

Figure 12:
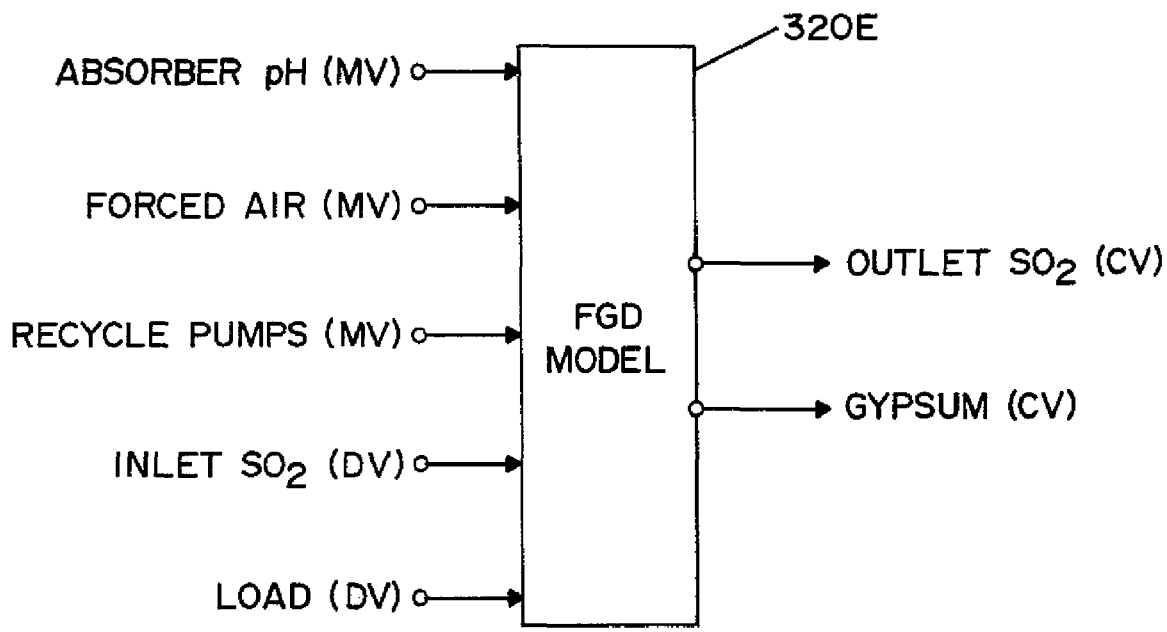
FIG. 12 illustrates an embodiment of a wet FGD model used in the wet FGD optimization system shown in FIG. 11.

FGD optimization system 300E uses model 320E, optimizer 310E, goals (cost function) and constraints, as described above. FIG. 12 shows an embodiment of model 320G used in FGD optimization system 300E.

In the illustrated embodiment, the manipulated variable (MV) inputs to model 320E of FIG. 12 include the pH concentration within the absorber tank, amount of forced air (i.e., forced oxygen) into the absorber tank, and the number and operational state of recycle pumps used to distribute the slurry in the absorber tower. The disturbance variable (DV) inputs to model 320E may typically include the following: the inlet $SO_2$ concentration and the load of the power generating unit. As shown in FIG. 12, the typical controlled variable (CV) outputs of model 320E are outlet $SO_2$ concentration, as well as gypsum properties (i.e., purity and amount).

Optimizer 310E uses model 320E of FIG. 12, along with the goals and constraints, to determine optimal operation of FGD 370E. The goals are expressed in the form of a cost function. In one embodiment, the cost function may be used to minimize outlet $SO_2$ emissions of FGD 370E while observing a limit on the purity of the gypsum. In another embodiment, the associated revenue generated by FGD 370E through $SO_2$ credits can be balanced against costs of operating the system. Using the foregoing approach, FGD optimization system 300E can be used to determine the optimal power consumption based upon current operating conditions and the desires of operators and engineers. U.S. patent application Ser. No. 10/927,229 (filed Aug. 27, 2004), entitled "Optimized Air Pollution Control" (fully incorporated herein by reference) discloses further details on a variety of different approaches to FGD optimization.

Multiple, Independent Optimization Systems

Figure 13:
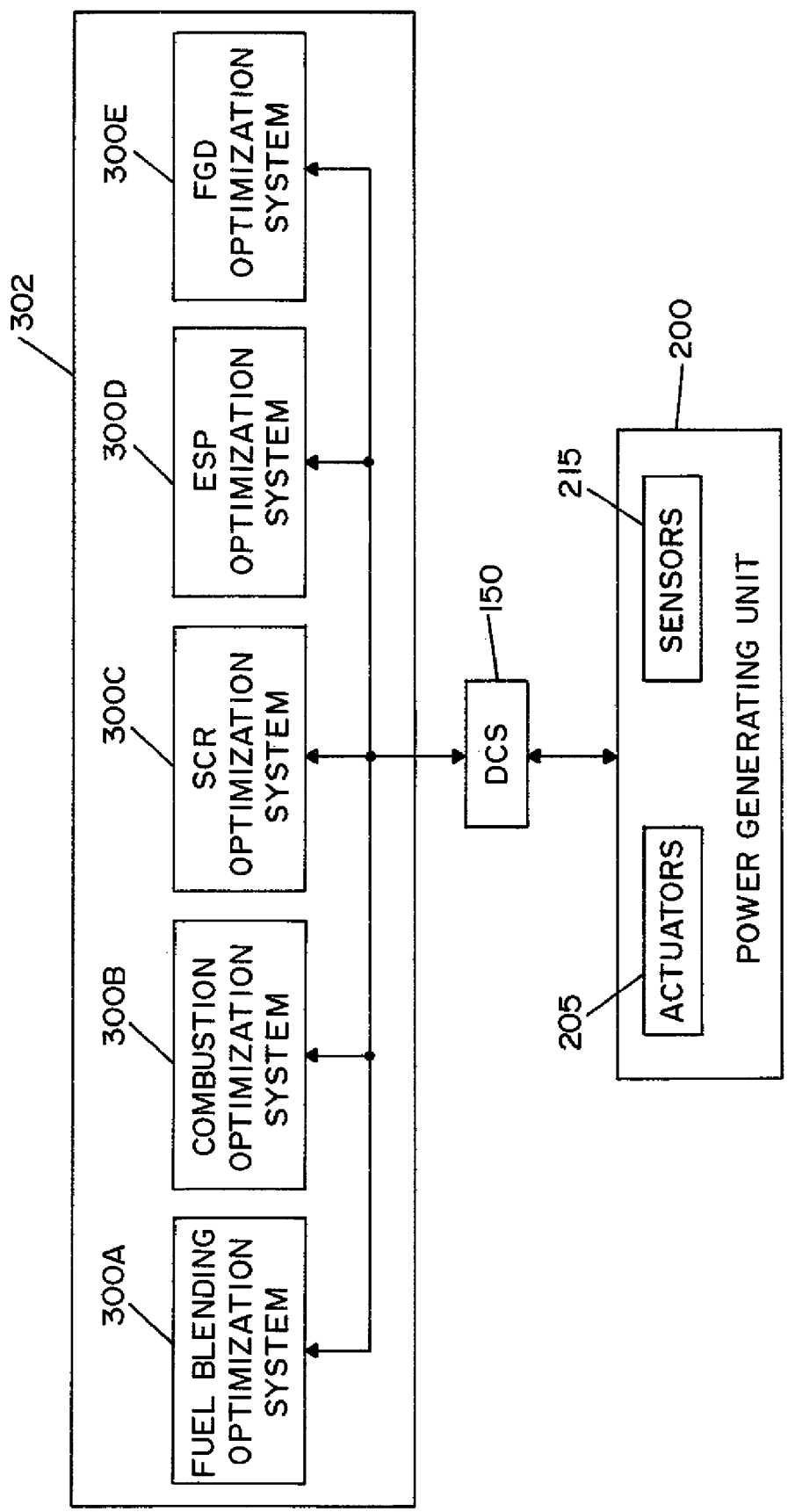
FIG. 13 illustrates a multi-component optimization system comprised of multiple, independent component optimization systems for fuel blending, combustion, SCR operation, ESP operation and wet FGD operation.

Referring now to FIG. 13, there is shown a group of independent component optimization systems 300A-300E that are used for controlling operation of power generating unit 200. Optimization systems 300A-300E are used to control separate component subsystems (e.g., fuel blending, boiler (combustion), SCR, ESP and FGD) within power generating unit 200. Optimization systems 300A-300E are described in detail above with reference to FIGS. 3-12. In accordance with the embodiment shown in FIG. 13, each optimization system 300A-300E operates independently of the other optimization systems 300A-300E. Optimization systems 300A-300E collectively form a multi-component optimization system 302.

One or more of optimization systems 300A-300E may be added or removed from multi-component optimization system 302 without affecting operation of the other optimization systems 300A-300E. It should be understood that the embodiment shown in FIG. 13 is representative of many different forms of unit wide optimization that can be achieved by use of a number of different optimization systems. For example, it is contemplated that other independent component optimization systems (e.g., a mill optimization system) could be included in multi-component optimization system 302. Furthermore, it should be appreciated that in one embodiment of the present invention multi-component optimization system 302 may be comprised of a single component optimization system.

Figure 14:
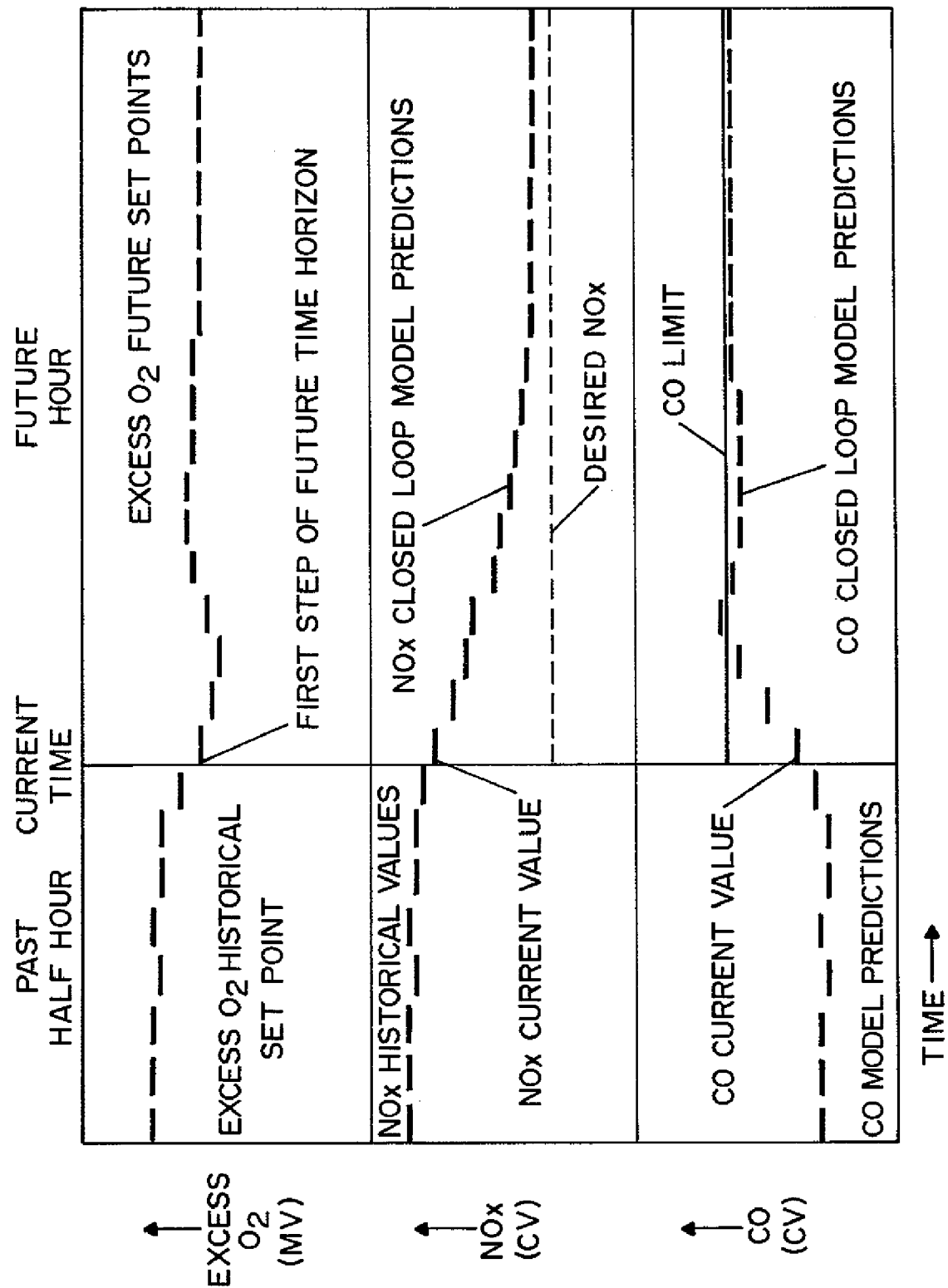
FIG. 14 is a graph of excess oxygen, NOx and CO as a function of time, illustrating operation of a combustion optimization system for lowering NOx while observing a limit on CO.

Operation of the combustion optimization system 300B shown in FIG. 13 will now be described in greater detail. FIG. 14 illustrates operation of an embodiment of combustion optimization system 300B. In this example, model 320B of FIG. 6 is used in combustion optimization system 300B of FIG. 5 to control NOx to a desired value while maintaining CO below a limit.

FIG. 14 is a graph of values for excess oxygen (MV), NOx (CV) and CO (CV) associated with the boiler, as a function of time. The graph includes past historical values for the MV and CVs over a half hour period of time, values for the MV and CVs at current time, optimized values of the future trajectory of the MV (i.e., excess oxygen) and predicted values of the future trajectory of the CVs. The graph of FIG. 14 also shows a desired value for NOx over the future time horizon, and a limit on CO over the future time horizon. In the illustrated example, boiler model 320B is a dynamic neural network model. Model 320B generates the predicted values for the CVs.

Given the desired value of NOx, the limit on CO, and dynamic neural network model 320B shown in FIG. 6, an optimizer 310B is used as described above to compute the MV trajectory for excess oxygen and the other MVs (not shown) associated with the boiler.

It should be appreciated that "feedback biasing" may be used to match the model predictions of NOx and CO to current conditions of power generating unit 200 (shown in FIG. 14) prior to an optimization cycle. After optimal setpoint values for the Mvs are computed, the first value in the time trajectory for each Mv is output by combustion optimization system 300B to DCS 150.

Figure 15:
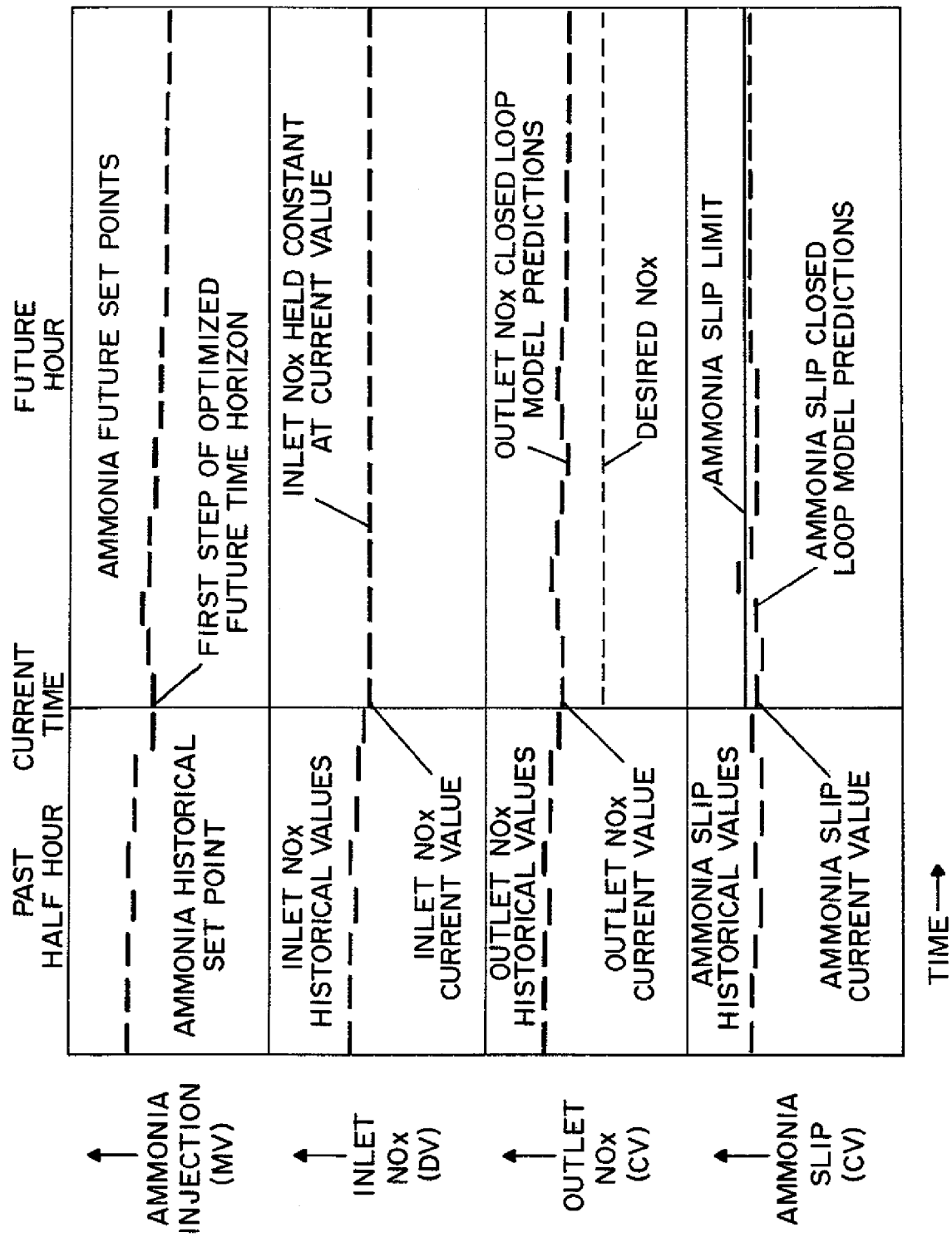
FIG. 15 is a graph of ammonia injection, inlet NOx, outlet NOx and ammonia slip as a function of time, illustrating operation of an SCR optimization system for lowering NOx while observing a limit on ammonia slip.

Operation of SCR optimization system 300C of FIG. 13 will now be described in greater detail. FIG. 15 illustrates operation of an embodiment of SCR optimization system 300C. In this example, model 320C of FIG. 8 is used in SCR optimization system 300C of FIG. 7 to minimize NOx towards a desired setpoint value while maintaining predicted ammonia slip below a user specified limit.

FIG. 15 is a graph of values for ammonia injection (MV), inlet NOx (DV), outlet NOx (CV), and ammonia slip (CV), as a function of time. The graph provides past values, current values, and future predicted values. The desired setpoint value for NOx and a user specified ammonia slip limit are also shown in FIG. 15.

In FIG. 15, the future time trajectory of the inlet NOx (DV), is held constant at the current inlet value. This approach is acceptable if NOx is not expected to change. However, if combustion optimization system 300B is used in conjunction with the SCR optimization system 300C, then the future inlet NOx trajectory of FIG. 15 is not expected to be constant. In this regard, the outlet NOx (CV) of the boiler is known to change, as shown in FIG. 14. Therefore, SCR optimization is not optimal because the information derived from combustion optimization system 300B is not communicated to SCR Optimization System 300C in the configuration shown in FIG. 13. This lack of information sharing motivates the multiple, coordinated component optimization systems described below.

Multiple, Coordinated Optimization Systems

Given the optimization systems 300A-300E described above, it can be observed that certain controlled variables of one component optimization system are disturbance variables in another component optimization system. For example, in fuel blending optimization system 300A, the fuel characteristics are controlled variables, while in combustion optimization system 300B, the fuel characteristics are disturbance variables. Likewise, NOx is a controlled variable in combustion optimization system 300B, while in SCR optimization system 300C, NOx is a disturbance variable. Accordingly, it can be observed that the controlled variables of a first component of a power generating unit may be disturbance variables to a second component of the power generating unit, downstream of the first component. Based upon this observation, the optimization systems 300A-300E can be executed sequentially, starting at a component upstream and working downstream. Thus, subsequent controlled variable trajectories can be fed forward from one optimization system to the next.

Figure 16:
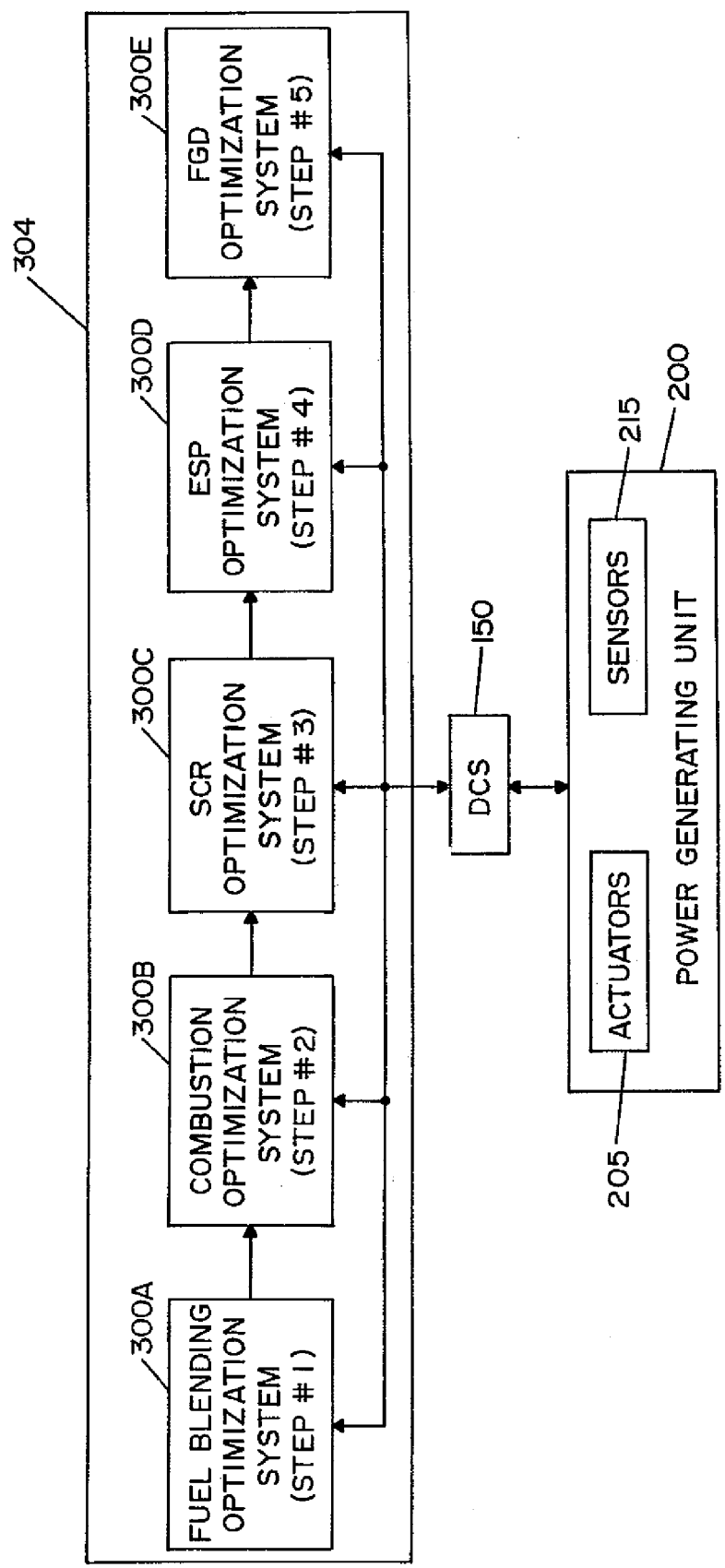
FIG. 16 illustrates a coordinated multi-component optimization system comprised of multiple, coordinated component optimization systems.

FIG. 16 illustrates an embodiment of the present invention wherein each component optimization system operates in sequence and feeds forward information to subsequent (i.e., downstream) component optimization systems. Configured in this manner, optimization systems 300A-300E collectively form a coordinated multi-component optimization system 304.

FIG. 16 is similar to FIG. 13 except that the optimizations are performed in sequence and the results of each component optimization system are fed forward to the next (i.e., downstream) component optimization system. In the illustrated embodiment, fuel blending optimization system 300A executes first. The outputs generated by optimization system 300A are then passed forward to combustion optimization system 300B. For example, trajectories of the blended fuel characteristics (CVs) are passed forward to the combustion optimization system 300B to be used as DVs. Combustion optimization system then executes using the trajectories of the blended fuel characteristics (DVs).

Figure 17:
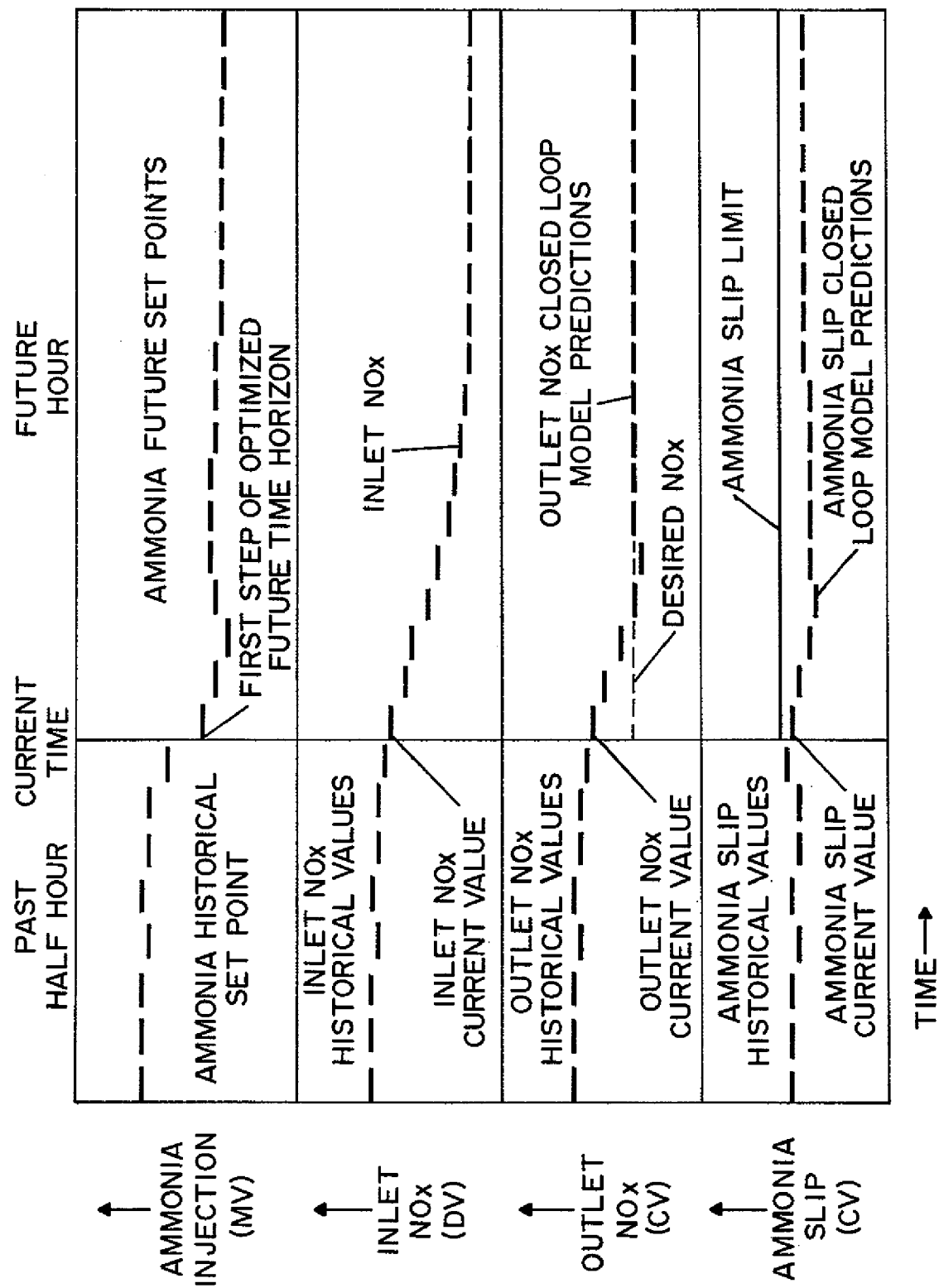
FIG. 17 is a graph of ammonia injection, inlet NOx, outlet NOx and ammonia slip as a function of time, illustrating operation of an SCR optimization system for controlling NOx while observing a limit on ammonia slip, wherein the future outlet NOx trajectory determined by a combustion optimization system is passed forward as the future inlet NOx trajectory for the SCR optimization system.

The NOx (CV) trajectory (e.g., see FIG. 14) determined by combustion optimization system 302B is forwarded to SCR optimization system 300C as a DV (i.e., inlet NOx). FIG. 17 is a graph similar to FIG. 15 that illustrates execution of SCR optimization system 300C using the NOx trajectory from combustion optimization system 300B as a DV (i.e., inlet NOx).

FIG. 15 shows SCR optimization without feed forward of the trajectory, while FIG. 17 shows SCR optimization with feed forward of the trajectory. Accordingly, it can be observed that the two approaches give significantly different values for the future trajectories of the manipulated variable, ammonia injection. In FIG. 15 (no feed forward), ammonia injection continues at a high level potentially leading to ammonia slip due to the effects of changes caused by combustion optimization system 300B. In FIG. 17 (feed forward), the ammonia injection is immediately decreased to compensate for the expected reduction in NOx.

Referring back to FIG. 16, it will be appreciated that in the coordinated optimization scheme of coordinated multi-component optimization system 304 outputs of SCR optimization system 300C can be forwarded to ESP optimization system 3009, and the outputs of ESP optimization system 300D can be forwarded to FGD optimization system 300E. By using the coordinated approach described above, all optimization systems 300A-300E maintain optimal performance.

Steady State Unit Optimization

Given a set of goals and constraints for each optimization system 300A-300E, the coordinated multi-component optimization systems 304 of FIG. 16 can be used to achieve optimal control of a power generating unit 200. However, determination of the goals and constraints for each optimization system 300A-300E is a challenging problem. For example, given a coordinated multi-component optimization system, it may be desirable to have an optimal desired value for NOx in the boiler (combustion system) when an SCR is used in the power generating unit. In this regard, it may be advantageous to remove more NOx during the combustion process using combustion optimization system 300B. Alternatively, it could be more advantageous to use SCR optimization system 300C to remove NOx. In the coordinated multi-component optimization system 304 of FIG. 16, these decisions are determined by an operator or an engineer.

Figure 18:
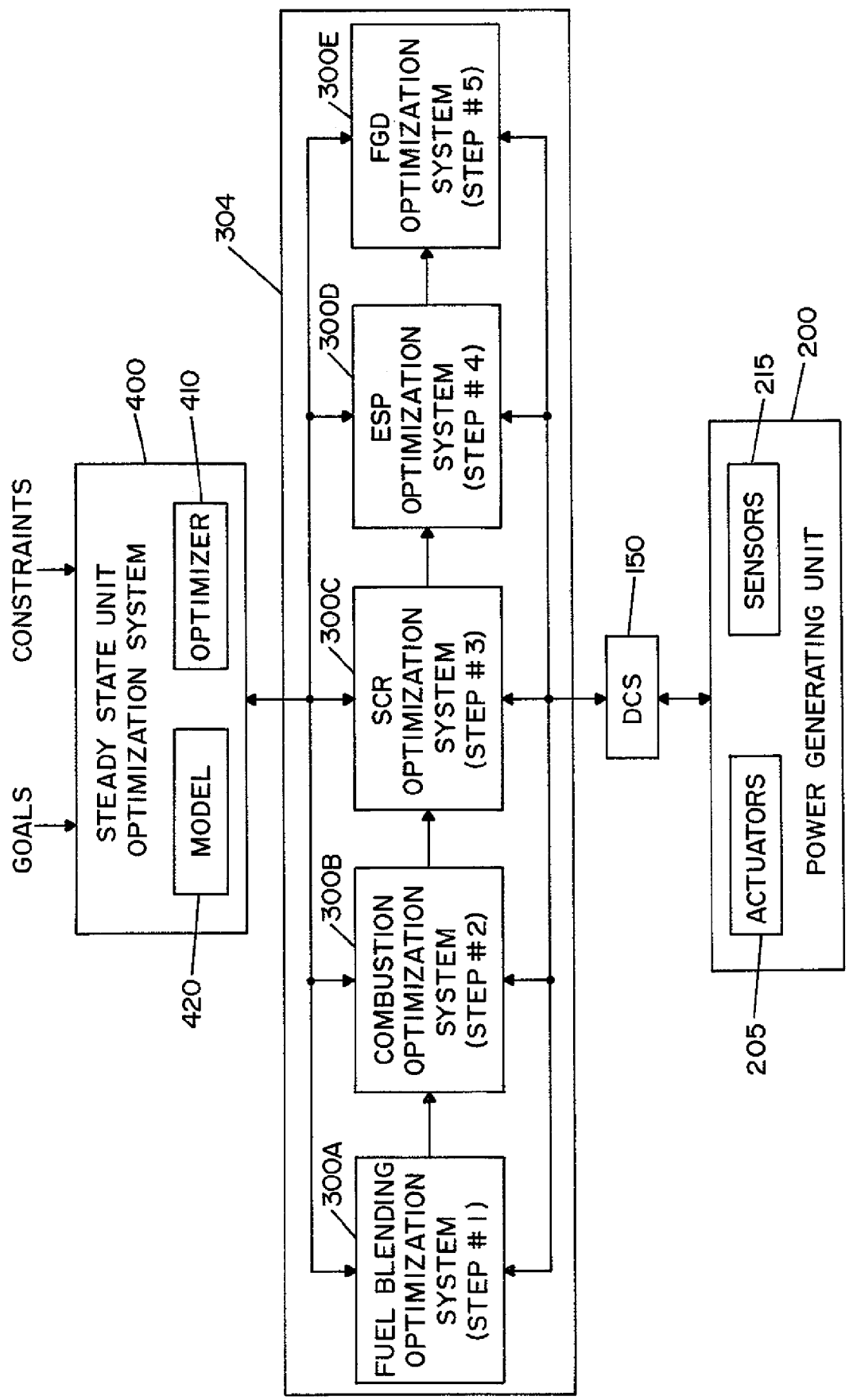
FIG. 18 illustrates a steady state unit optimization system for determining goals and constraints for a coordinated multi-component optimization system comprised of multiple, coordinated component optimization systems.

FIG. 18 illustrates a steady state unit optimization system 400 for automating and coordinating goals and constraints (e.g., limits on emissions of NOx, $SO_2$, $CO_2$, CO, mercury, ammonia slip and particulate matter) for each optimization system 300A-300E that comprises coordinated multi-component optimization system 304 of FIG. 16. More specifically, steady state unit optimization system 400 determines optimal values of the goals and constraints to be used by each optimization system 300A-300E.

Steady state unit optimization system 400 is implemented by a standard optimization system, such as optimization system 100 shown in FIG. 2. In particular, steady state unit optimization system 400 includes a unit model 420 and a unit optimizer 410. However, instead of communicating with a DCS 150, steady state unit optimization system 400 communicates directly with each optimization systems 300A-300E that comprises coordinated multi-component optimization system 304.

Figure 19:
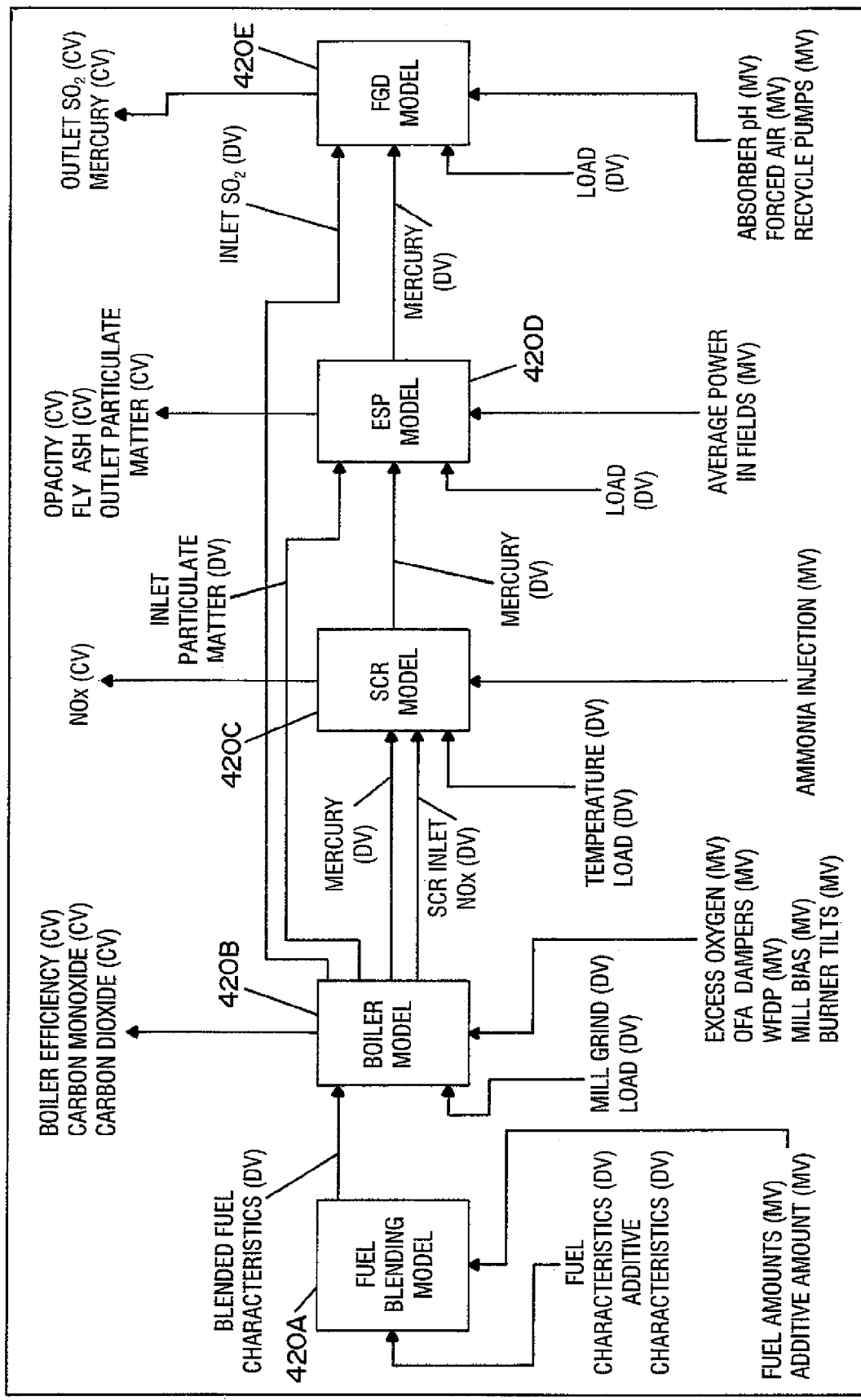
FIG. 19 illustrates an embodiment of a steady state unit model used in the steady state unit optimization system of FIG. 18.

FIG. 19 illustrates an embodiment of unit model 420 for use in steady state unit optimization system 400. In the embodiment shown, unit model 420 is a steady state model, rather than a dynamic model. However, it is also contemplated that unit model 420 may alternatively be a dynamic model, as will be described below. However, in many cases (primarily due to convenience of implementation) there are advantages to using a steady state model.

As shown in FIG. 19, steady state unit model 420 is comprised of steady state models of various components (i.e., fuel blending, boiler, SCR, ESP and FGD) of power generating unit 200. Models 420A-420E are steady state versions of models 320A-320E, described in detail above with reference to FIGS. 4, 6, 8, 10 and 12. Accordingly, fuel blending model 420A is substantially the same as steady state version of model 320A illustrated in FIG. 4. For convenience, the manipulated variables (MVs) associated with each dynamic model 420A-420E are grouped together as inputs at the bottom of each model. In addition, for some models a group of inputs have been identified by a single input. For example, in fuel blending model 420A, "Fuel Characteristics" represents fuel #1 characteristics, fuel #2 characteristics and fuel #3 characteristics, as shown in FIG. 4, and "Fuel Amounts" represents fuel #1 amount, fuel #2 amount and fuel #3 amount, as shown in FIG. 4.

In FIG. 19, the controlled variables (CVs) associated with each model 420A-420E are shown as outputs at the top of each model. In the illustrated embodiment, the controlled variables include boiler efficiency, emitted CO, emitted NOx, stack opacity, fly ash characteristics, emitted particulate matter, emitted $SO_2$, and emitted mercury. Furthermore, it should be appreciated that the inputs and outputs to some models shown in FIG. 19 may vary from those shown in FIGS. 4, 6, 8, 10 and 12.

Disturbance variables (DV) associated with each model 420A-420E are shown as inputs to the left side of each model. As described above, the controlled variable outputs of one model may be disturbance variable inputs to another (downstream) model. The relationship between CVs and DVs is represented by connections between models 420A-420E within steady state unit model 420.

Using steady state unit model 420 of FIG. 19 and specified goals and constraints, the steady state unit optimizer 410 determines the optimal steady state setpoint values for manipulated and/or controlled variables. Unlike the optimization system 100 of FIG. 2, the optimal setpoint values determined by steady state unit optimization system 400 are not output to a DCS 150 for control of a power generating plant. Instead, as shown in FIG. 18, the results of the steady state optimization are used to set the goals and potentially constraints for each individual component optimization system 300A-300E of coordinated multi-component optimization system 304. Using the goals and constraints determined by steady state unit optimization system 400, the individual component optimization systems 300A-300E determine the appropriate values for the manipulated variables which are then sent to DCS 150.

Typically, the cost function used by steady state unit optimizer 410 includes economic data. For example, the cost function may include data related to the cost of fuels, cost of additives, cost of ammonia, cost of limestone for the FGD, cost of internal electric power for the power generating unit, etc. In addition, the cost function used by steady state unit optimizer 410 may include data related to the price of electricity, cost of NOx credits, cost of $SO_2$ credits and price of gypsum. Using this data along with steady state unit model 420, steady state optimization can be used to maximize operating profits of a power generating plant.

Example of Steady State Unit Optimization

Figure 20:
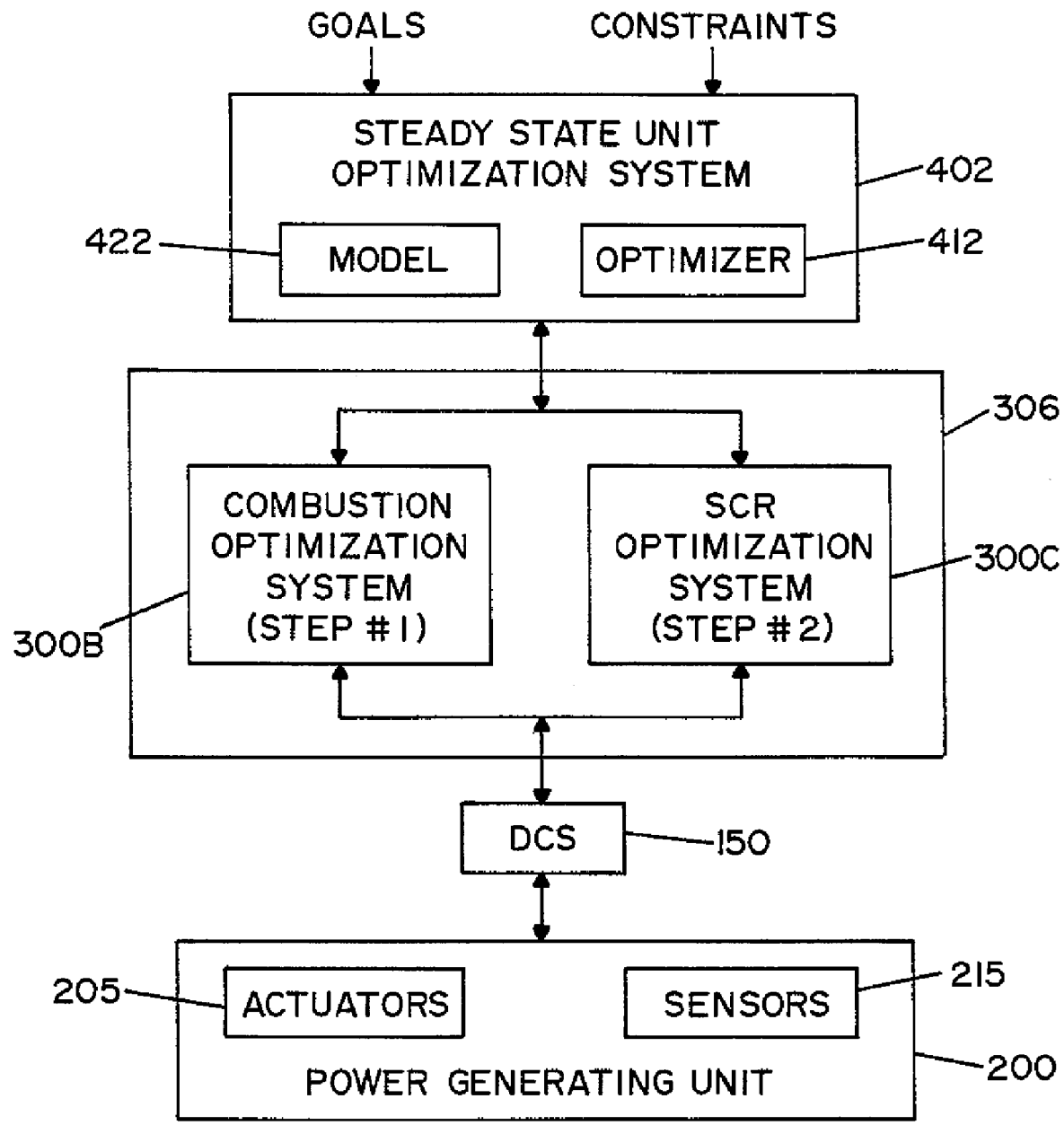
FIG. 20 is an example of a steady state unit optimization system with a coordinated multi-component optimization system including a combustion optimization system and an SCR optimization system, the steady state unit optimization system determining optimal boiler efficiency and NOx removal from the boiler and SCR using economic data.
Figure 21:
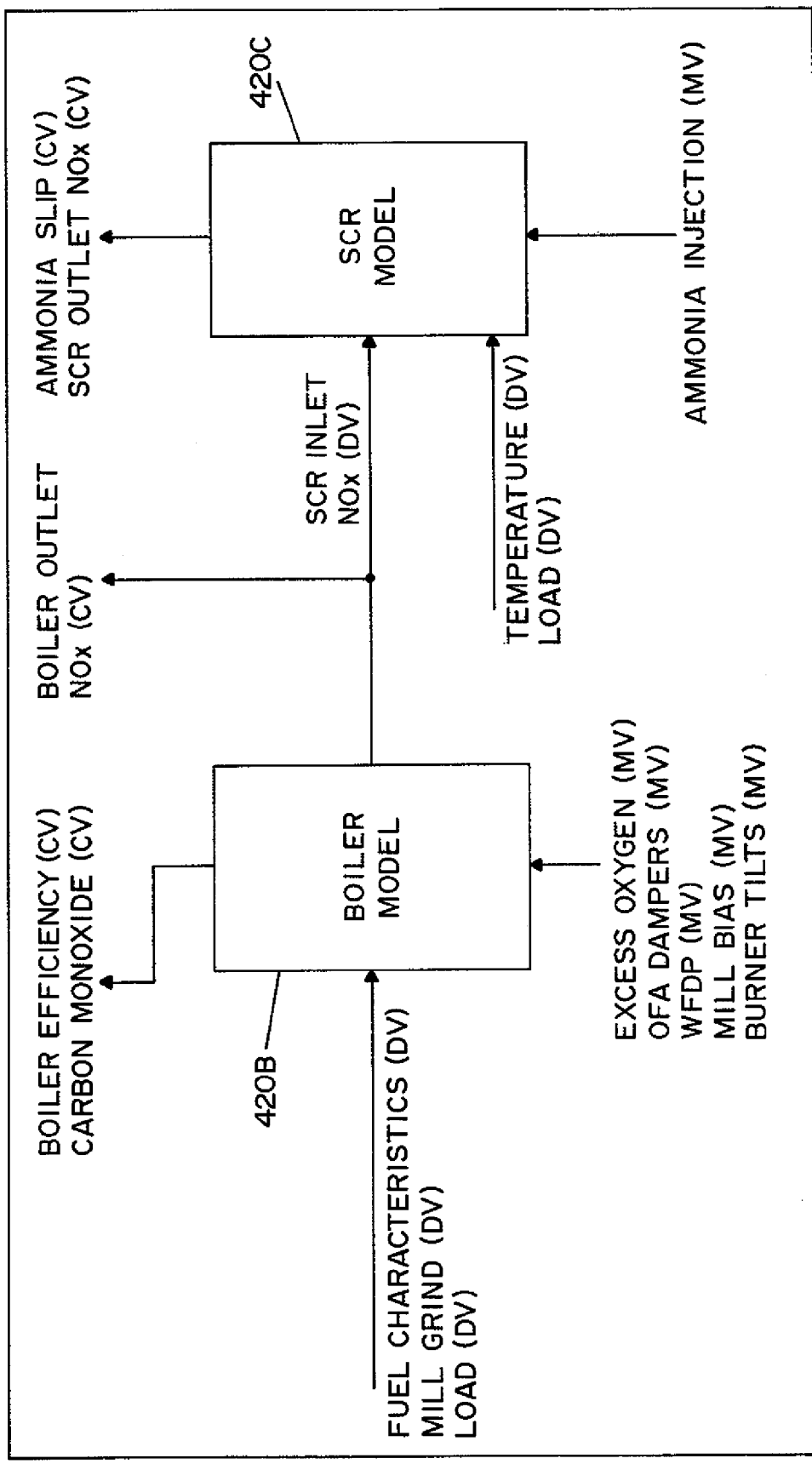
FIG. 21 illustrates an embodiment of a model used in the example steady state unit optimization system of FIG. 20.

An example of steady state unit optimization will now be described with reference to FIGS. 20 and 21. FIG. 20 shows a steady state unit optimization system 402 and a coordinated multi-component optimization system 306. Steady state unit optimization system 402 includes a steady state unit model 422 and a unit optimizer 412. Coordinated multi-component optimization system 306 is comprised of combustion optimization system 300B and SCR optimization system 300C. FIG. 21 is a general overview of unit model 422 used in steady state unit optimization system 402. The primary controlled variables (CVs) used in this example include boiler efficiency, CO, boiler outlet NOx, ammonia slip, and SCR outlet NOx.

In the illustrated example, steady state unit optimizer 412 is used to determine economic trade-offs between improvements in boiler efficiency and reductions of NOx, in both the boiler and the SCR. The complex, nonlinear relationships associate with making economic trade-offs between components of a power generating unit 200 is illustrated in this example. More specifically, this example illustrates the complexity of determining how much NOx should be removed in a boiler using combustion optimization versus how much NOx should be removed in an SCR using SCR optimization.

The goal of steady state unit optimizer 402 is to determine the minimum operational cost of power generating unit 200 over a one hour period at a constrained fixed load, given current operating conditions and economic data. To achieve this goal, the following economic data is needed: cost of the fuel per ton, cost of ammonia per ton, and cost of NOx credits per ton. For this example, the following costs are used:

Cost of Fuel=$C_{Fuel}$=46.00 ($/ton)

Cost of Ammonia=$C_{Ammonia}$=295.00 ($/ton)

Cost of NOx Credits=$C_{NOx}$=2500.00 ($/ton)

In the illustrated example, the boiler is a tangentially fired unit burning a blend of bituminous coal. Power generating unit 200 is required to maintain a load of 500 MW, which requires a heat input of 5515 Mbtu/hr without the use of a combustion optimization system. The heat value of the coal is 11,230 lb/btu. Given this information, the amount of coal used in the boiler prior to combustion optimization (nominal operations) can be computed as follows:

$$\text{Tons of Coal (per hour)} = A_{Coal}$$
$$= (\text{Heat Input}/\text{Heat Value})/2{,}000$$
$$= \left[\left(\frac{5{,}515{,}000{,}000 \text{ btu}/hr}{11{,}230 \text{ lb}/btu}\right)\right]/2{,}000 \text{ lbs/ton}$$
$$= 245 \text{ tons/hour}$$

The load factor, L, is the following function of the amount of coal burned, $A_{Coal}$, the efficiency of the boiler, $B_{Eff}$, and the efficiency of the remainder of the unit, $S_{Eff}$.

$$L = A_{Coal} * B_{Eff} * S_{Eff} \quad (1)$$

Assuming that the boiler efficiency prior to combustion optimization is nominally 91% and the remainder of the unit is 38% (a total nominal unit efficiency of 35%), the required load factor is $$L = 245 * 0.91 * 0.38 = 84.7$$

In this example, the load in megawatts is fixed, thus fixing the load factor, L, to 84.7. Boiler efficiency can be changed by combustion optimization; however, the remainder of unit efficiency is assumed to be unaffected by combustion optimization and is thus fixed. Under these assumptions, L is fixed at 84.7 and remaining unit efficiency is fixed at 38%. Given equation 1, the following relationship between the amount of coal (per hour) and boiler efficiency can be established:

$$84.7 = A_{Coal} * B_{Eff} * 0.38$$
$$222.95 = A_{Coal} * B_{Eff} \quad (2)$$

Equation 2 illustrates that at a fixed load, if the boiler efficiency increases, then the amount of coal (per hour) decreases. Using equation 2, the amount of coal used (per hour) may be expressed as a function of boiler efficiency, $$A_{Coal} = 222.95/B_{Eff} \quad (3)$$

Given the amount of coal used (per hour), the cost of coal used per hour is given by:

$$\text{Cost of Coal per Hour} = C_{Fuel} * A_{Coal} = 46 * A_{Coal},$$

where $C_{Fuel}$ represents the cost of coal per ton.

Using equation 3, the cost of coal used per hour may be expressed as a function of boiler efficiency, $$\text{Cost of Coal per Hour}_{Fuel} = 46 * (222.95/B_{Eff}) = 10{,}255/B_{Eff}$$

The cost of coal (per hour) is expressed in terms of a controlled variable (i.e., boiler efficiency $B_{Eff}$) in boiler model 420B of steady state unit model 422.

Next, the revenue from NOx credits and the cost of ammonia are determined for power generating unit 200. To begin this calculation, the amount of NOx exiting the boiler per hour is needed. Given the amount of coal burned per hour, $A_{Coal}$, the heat index of the coal (in this case 11,230 btu/lb), and the NOx emission rate in lbs/mmBtu from the boiler (a controlled variable in boiler model 420B of steady state unit model 422), the tons of NOx per hour may be computed as follows:

$$\text{Tons of NOx from Boiler} = \frac{\text{Amout of Coal} * \text{Heat Index} * \text{NOx rate (boiler)}}{}$$
$$= A_{Coal} * 11{,}230 * NOx_{Boiler}/1{,}000{,}000$$
$$= 0.01123 * A_{Coal} * NOx_{Boiler}$$

Once again, using equation 3, the tons of NOx per hour can be expressed as a function of the controlled variables of steady state unit model 422, $$\text{Tons of NOx from Boiler} = 0.01123 * 222.95/B_{Eff} * NOx_{Boiler}$$
$$= 2.504 * NOx_{Boiler}/B_{Eff}$$

Given the NOx emission rate from the SCR (a controlled variable in SCR model 420C of steady state unit model 422), the tons of NOx emitted from the SCR may be similarly calculated as $$\text{Tons of NOx from SCR} = 2.504 * NOx_{SCR}/B_{Eff}$$

where $NOx_{SCR}$ is the emission rate from the SCR in lb/mmBtu. The cost of emitting the NOx from the SCR per hour is given by the following:

Cost of NOx per hour = Cost of NOx credits per Ton * Tons of NOx per hour

Given a cost of $2,500 for the NOx credits, the cost of emissions per hour is:

$$\text{Cost of NOx per hour} = 2500 * \text{Tons of NOx per hour}$$
$$= 2500 * 2.504 * NOx_{SCR}/B_{Eff}$$
$$= 6260 * NOx_{SCR}/B_{Eff}$$

The SCR in this example requires 0.4 tons of ammonia to remove 1.0 ton of NOx. Thus, by determining the tons of NOx removed in the SCR, the amount of ammonia can be determined using the following expression, $$\text{Tons of Ammonia per Hour} = 0.4 * \left(\frac{\text{Boiler Tons of } NOx -}{\text{SCR Tons of } NOx}\right)$$
$$= 0.4 * \left(\frac{2.504 * NOx_{Boiler}/B_{Eff} -}{2.504 * NOx_{SCR}/B_{Eff}}\right)$$
$$= 1.0 * \left(\frac{NOx_{Boiler}/B_{Eff} -}{NOx_{SCR}/B_{Eff}}\right)$$
$$= (NOx_{Boiler} - NOx_{SCR})/B_{Eff}$$

The cost of the ammonia used to remove the NOx is given by:

Cost of Ammonia per hour = Cost of Ammonia per Ton * Tons of Ammonia per hour

Given a cost of $295 per ton of ammonia, the cost of ammonia per hour is:

Cost of Ammonia per hour=295*($NOx_{Boiler} - NOx_{SCR}$)/$B_{Eff}$

Given the cost of coal, NOx credits, and ammonia, the total cost associated with the boiler and SCR over a one hour period is:

$$\text{Total Cost} = \text{Cost of Fuel} + \text{Cost of } NOx + \text{Cost of Ammonia}$$
$$= 10{,}255/B_{Eff} + 6260*NOx_{SCR}/B_{Eff} +$$
$$295*(NOx_{Boiler} - NOx_{SCR})/B_{Eff}$$

$$\text{Total Cost} = \left( \frac{10{,}255 + 295*NOx_{Boiler} +}{5965*NOx_{SCR}} \right) \Big/ B_{Eff}$$

The total cost shows the trade-offs among the three primary controlled variables: rate of NOx emissions from the boiler, rate of NOx emissions from the SCR, and boiler efficiency. Because of the nonlinear form of the cost function and the nonlinear relationship of the MVs and DVs to the CVs of unit model 422 shown in FIG. 21, the relationship between the manipulated variables and the cost function is complex. Nevertheless, given the appropriate constraints on operations of the power generating plant (such as those on CO, ammonia slip, and the MVs), unit optimizer 412 can be used to minimize the total cost described above, and thus determine the optimal values for the MVs and CVs.

Using the approach described above, optimal settings for boiler efficiency and the emission rates of NOx from the boiler and SCR are determined by steady state unit optimizer 412. These optimal values can then be used to set the goals for coordinated multi-component optimization system 306 comprised of combustion optimization system 300B and SCR optimization system 300C (FIG. 21). Thus, steady state unit optimizer 412 is used to determine the optimal goals for coordinated multi-component optimization system 306 (comprised of combustion optimization system 300B and SCR optimization system 300C) based upon the economics associated with power generating unit 200. It is believed that use of the present invention as described above will result in significant cost savings for power plant owners.

Unit Wide Optimizers and Controllers

Returning now to FIG. 18, "unit wide" steady state unit optimizer 410 of steady state unit optimization system 400 directs dynamic optimizers 310A-310E of coordinated multi-component optimization system 304. As described above, steady state model 420 is used in "unit wide" optimization, while dynamic models 320A-320E are used in optimization of individual components of power generating unit 200 (e.g., fuel blending system, boiler, SCR, ESP and FGD).

While in a preferred embodiment of the present invention steady state models are used for unit optimization and dynamic models are used for optimization of individual components, it is contemplated in accordance with alternative embodiments of the present invention that steady state models may be used for optimization of individual components and dynamic models may be used for unit optimization.

Figure 22:
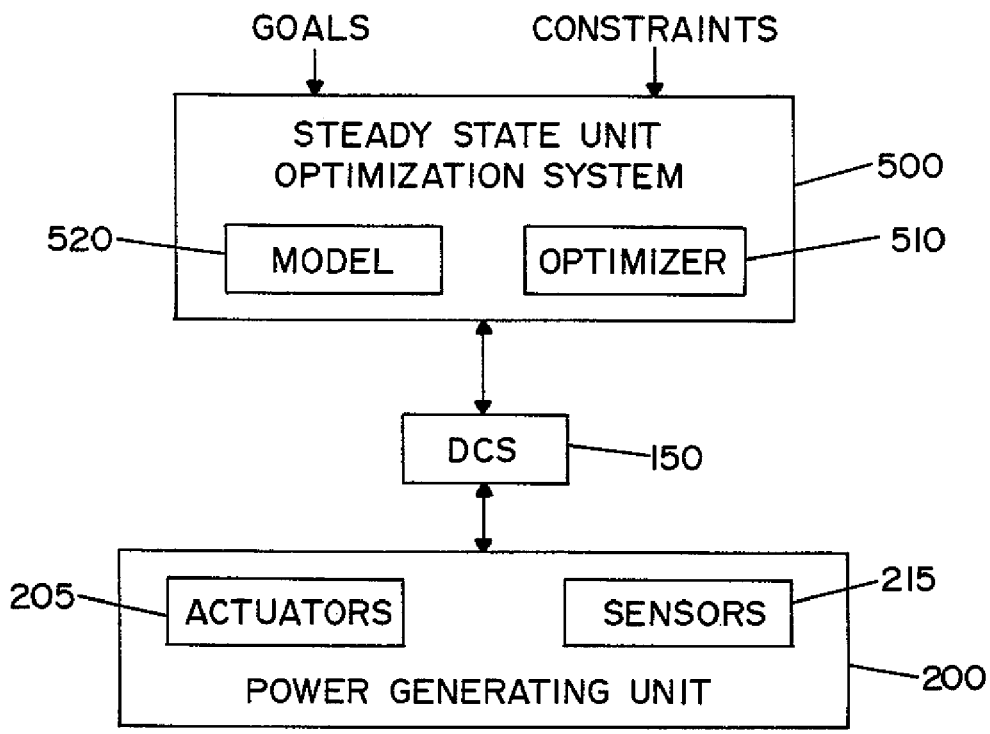
FIG. 22 illustrates a steady state unit optimization system in direct communication with a DCS to control operation of a power generating unit.

If steady state models are used for unit optimization system 400 (FIG. 18) and component optimization systems 300A-300E of multi-component optimization system 304 (FIG. 18), it is then possible to combine unit optimization system 400 and coordinated multi-component optimization system 304 into a single unit optimization system 500, shown in FIG. 22. In this regard, when steady state models 320A-320E are used in all component optimization systems 300A-300F of coordinated multi-component optimization system 304, then component optimization systems 300A-300E become redundant to steady state unit optimization system 400 As a result, multi-component optimization system 304 may be eliminated, and unit optimization system 500 may be used to directly determine optimal setpoint values for manipulated variables of components of power generating unit 200.

Unit optimization system 500 include a steady state unit model 520 and a steady state unit optimizer 510. Steady state unit model 520 includes models 320A-320E of component optimization systems 300A-300E of FIG. 18. Using steady state unit optimization system 500 shown in FIG. 22, each component of power generating unit 200 is controlled, and optimal setpoint values for the MVs are sent directly to DCS 150. In this case, steady state unit optimizer 510 typically determines the optimal setpoint values for manipulated variables based upon desired operating conditions and economic data. It should be understood that in this embodiment of the present invention, only one optimizer and one cost function are needed to determine the optimal setpoint values fro the manipulated variables.

Returning now to FIG. 18, still another embodiment of the present invention will be described. In this embodiment, a combination of steady state models and dynamic models are used among component optimization systems 300A-300E. For example, a steady state model 320A is used for fuel blending optimization system 300A, while dynamic models 320B-320E are used for boiler, ESP, SCR and FGD optimization systems 300B-300E. Steady state unit optimization system 400 is used to determine goals and constraints for both steady state optimizer 310A of fuel blending optimization system 300A and dynamic optimizers 310B-310E of optimization systems 300B-300E.

If dynamic models (rather than steady state model) are used for both unit optimization system 400 (FIG. 18) and component optimization systems 300A-300E of multi-component optimization system 304 (FIG. 18), then individual component optimization systems 300A-300E are redundant to the dynamic unit optimization system 400. Therefore, it is then possible to combine unit optimization system 400 and coordinated multi-component optimization system 304 into a single dynamic unit optimization system 600, shown in FIG. 23. In this embodiment of the present invention, dynamic unit optimization system 600 includes a dynamic unit model 620 and a unit optimizer 610. Dynamic unit model 620 includes dynamic models 320A-320E of component optimization systems 300A-300E. Single dynamic model 620 is determines optimal setpoint values for manipulated variables associated with power generating unit 200, based upon desired operating conditions and economics. It should be understood that in this embodiment of the present invention, only one optimizer and one cost function are needed to determine the optimal setpoint values fro the manipulated variables.

Figure 23:
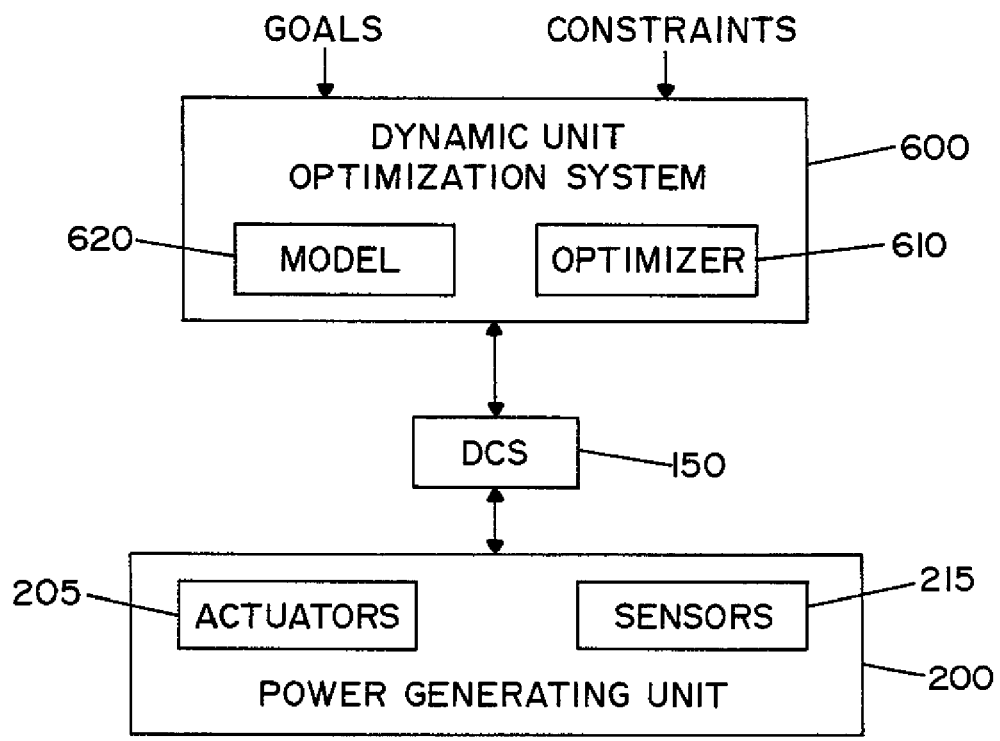
FIG. 23 illustrates a dynamic unit optimization system using a single dynamic model of a power generating unit, wherein said dynamic unit optimization system communicates directly with a DCS to control operation of a power generating unit.

According to yet another embodiment of the present invention, steady state models and dynamic models may mixed among models 420A-420E of unit model 420 (FIG. 19). For example, a steady state model 420A for fuel blending may be used in combination with dynamic models 420B-420E for a boiler, SCR, ESP and FGD. Since at least one of the models 420A-420E is a dynamic model, the entire unit model 420 is therefore dynamic. As a result, unit model 420 and can be used as dynamic unit model 620 of dynamic unit optimization system 600 (FIG. 23).

As described above, a variety of different types of (steady state and dynamic) models may be used in the optimization systems of FIG. 18. Described herein are several different embodiments of the models. However, it should be understood that the present invention includes embodiments of the models beyond those described in detail herein.

Multi-Unit Optimization

Figure 24:
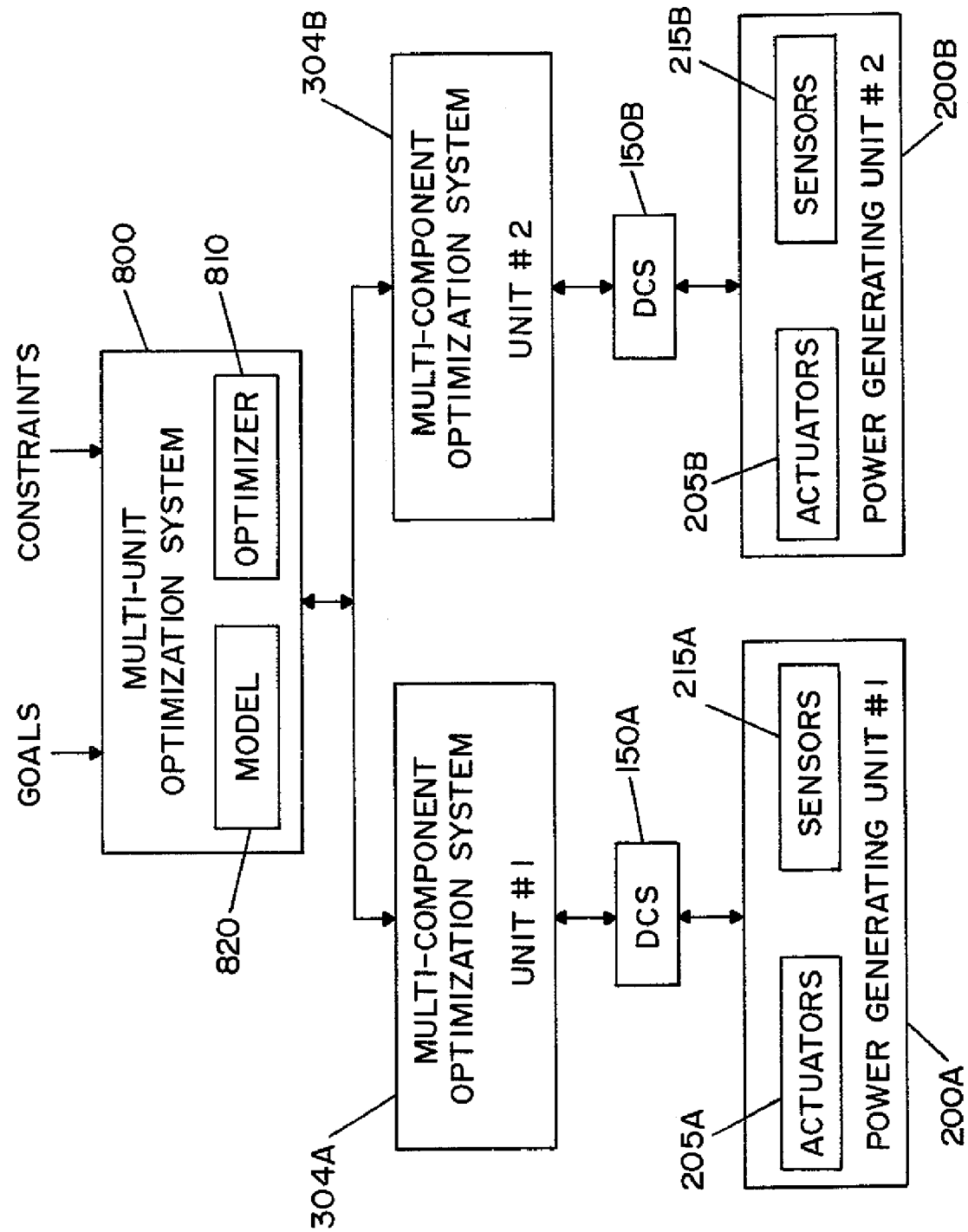
FIG. 24 illustrates a multi-unit optimization system in communication with a plurality of multi-component optimization systems, each multi-component optimization system associated with a different power generating unit.

Optimization systems described above have been used to make trade-offs between various components within a single power generating unit. However, it is often desirable to make trade-offs between components across multiple power generating units. Referring now to FIG. 24, there is shown a multi-unit optimization system 800 comprised of a multi-unit model 820 and a multi-unit optimizer 810. Multi unit optimization system 800 is used to set goals and constraints for optimizers of multi-component optimization systems 304A and 304B based upon operational and economic data. Multi-component optimization systems 304A, 304B are respectively associated with power generating units 200A and 200B. Each multi-component optimization system 304A, 304B is comprised of individual component optimization systems (such as component optimization systems 300A-300E, described above) for controlling power generating unit components (such as fuel blending systems, boiler, SCR, ESP, FGD, etc.) of the respective power generating units 200A, 200B. In this regard, multi-component optimization system 304A communicates with a DCS 150A to control power generating unit 200A. Power generating unit 200A includes actuators 205A and sensors 215A. Likewise, multi-component optimization system 304B communicates with a DCS 150B to control power generating unit 200B. Power generating unit 200B includes actuators 205B and sensors 215B.

In a preferred embodiment, multi-component optimization systems 304A and 304B are coordinated multi-component optimization systems, similar to coordinated multi-component optimization system 304 shown in FIG. 18. Thus, each component optimization system feeds forward to the next (i.e., downstream) component optimization system.

Figure 25:
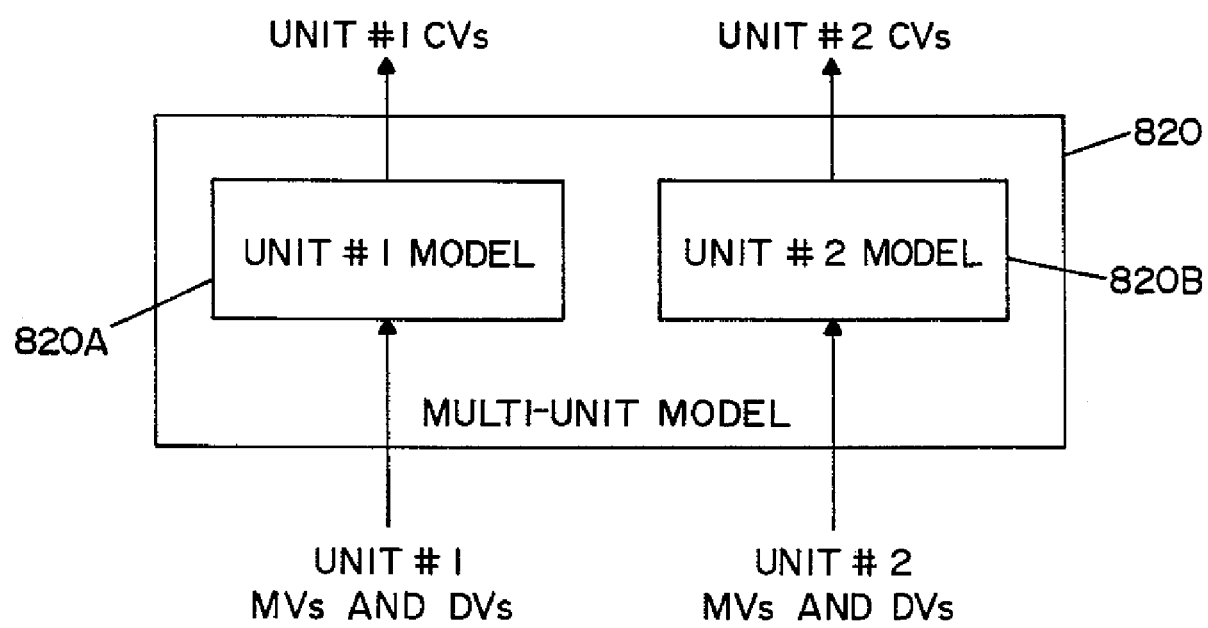
FIG. 25 illustrates an embodiment of a multi-unit model used in the multi-unit optimization system of FIG. 24.

FIG. 25 illustrates an embodiment of multi-unit model 820 used in the multi-unit optimization system 800, shown in FIG. 24. In this embodiment, multi-unit model 820 is comprised of unit models 820A and 820B. Each unit models 820A, 820B may take the form model 420 of unit optimization system 400 (FIG. 18). In this case, there is no interaction between the power generating units 200A and 200B. However, it is possible that power generating units 200A, 200B may share common MVs, DVs or CVs. For example, it is not uncommon for power generating units to share the same stack. In this case, the flue gases are combined and many of the CVs, such NOx emissions, would be a shared CV.

In a preferred embodiment, multi-unit model 820 of multi-unit optimization system 800 is a steady state model and the models used in multi-component optimization systems 304A, 304B are dynamic models. Thus, multi-unit optimization system 800 performs a steady state optimization that determines goals and constraints for use by dynamic optimizers of multi-component optimization systems 304A, 304B.

It is further contemplated that both steady state models and dynamic models may be used in any combination within multi-unit optimization system 800 and multi-component optimization systems 304A, 304B. In this regard, the models used in multi-unit optimization system 800 and multi-component optimization systems 304A, 304B may be steady state models, dynamic models or a combination of steady state and dynamic models. It is possible that some combinations may result in redundancy between the multi-unit optimization system 800 and multi-component optimization systems 304A, 304B. In these cases, the multi-component optimization systems 304A, 304B may be eliminated, and multi-unit optimization system 800 may be used to directly determine setpoint values for MVs of components of power generating units 200A and 200B.

It is possible that the multiple power generating units are not located at the same physical location. Thus, it is possible to perform multi-unit optimization across several different power generating units that are located at several different power generating plants. Using this approach, a multi-unit optimization system can be used to perform a fleet wide optimization across an enterprise's fleet of power generating units.

Multi-Unit Optimization Example

An embodiment of multi-unit optimization system 800 will now be described in detail with reference to FIGS. 24 and 25. In this embodiment, the multi-unit steady state optimizer 810 is used to determine economic trade-offs between improvements in boiler efficiency and reductions of NOx in the boilers and SCRs of the two power generating units 200A, 200B. It should be understood that the present example is an extension of the single unit optimization system described above.

For convenience, multi-unit optimization system 800 is used on two sister power generating units 200A, 200B of the type described above in connection with single unit optimization. In addition, the above described economic data used in single unit optimization will be once again used.

Model 820 is comprised of unit models 820A and 820B (FIG. 25). Unit models 820A and 820B each take the form of steady state unit model 422 shown in FIG. 21. Therefore, each unit model 820A and 820B includes steady state models substantially similar to boiler model 420B and SCR model 420C. The MVs, DVs, and CVs for both power generating units 200A, 200B are described in detail above with respect to single unit optimization.

The cost function for this embodiment of multi-unit optimization can be formed by combining the cost function for both power generating units 200A, 200B that was derived above in connection with single unit optimization. Therefore, the cost function may be written as $$\text{Cost} = (10{,}255 + 295 * \text{NOx}_{1,Boiler} + 5965 * \text{NOx}_{1,SCR})/B_{1,\mathit{Eff}} + (10{,}255 + 295 * \text{NOx}_{2,Boiler} + 5965 * \text{NO}_{2,SCR})/B_{2,\mathit{Eff}}$$

where $\text{NOx}_{1,Boiler}$ is the NOx outlet from boiler #1, $\text{NOx}_{1,SCR}$ is the NOx outlet from SCR #1, $B_{1,\mathit{Eff}}$ is the boiler efficiency of unit #11 $\text{NOx}_{2,Boiler}$ the NOx outlet from boiler #2, $\text{NOx}_{2,SCR}$ is the NOx outlet from SCR #2, and $B_{2,\mathit{Eff}}$ is the boiler efficiency of unit #2.

Using the cost function described above, model 820 of FIG. 25, and operational constraints on MVs and CVs (such as constraints on CO and ammonia slip) in each power generating unit 200A, 200B, multi-unit optimizer 810 may be used to determine optimal values of MVs and CVs. Based upon the results obtained by multi-unit optimizer 810, goals for boiler efficiency, combustion NOx reduction and SCR NOx reduction can be sent to the individual component optimizers of multi-component optimization systems 304A and 304B. The individual component optimizers of multi-component optimization systems 304A, 304B can then use the goals to determine optimal setpoint values for MVs of the two boilers (i.e., boiler unit #1 and boiler unit #2) and the two SCRs (i.e., SCR unit #1 and SCR unit #2).

Using the foregoing approach, the trade-offs between NOx reduction in the two boilers and two SCRs, and performance of the boilers can be determined based upon current operating conditions and economics. Accordingly, the present invention allows operators to derive maximum economic benefit from their power generating units while observing operational and safety constraints.

Other modifications and alterations will occur to others upon their reading and understanding of the specification. It is intended that all such modifications and alterations be included insofar as they come within the scope of the invention as claimed or the equivalents thereof.

Having described the invention, the following is claimed:

1. A computer system programmed to optimize operation of a plurality of power generating units, each of said plurality of power generating units comprised of a plurality of components, the computer system comprising:
a plurality of multi-component optimization systems, each multi-component optimization system respectively associated with one of said plurality of power generating units, wherein each multi-component optimization system is comprised of a plurality of component optimization systems, each component optimization system associated with optimizing one component of the respective power generating unit, wherein each component optimization system includes:
a model of the component, said model receiving input values associated with manipulated variables and disturbance variables, and predicting an output value for at least one controlled variable associated with operation of said component, wherein the manipulated variables are variables changeable by an operator or a component optimization system to affect the at least one controlled variable, and
an optimizer for determining optimal setpoint values for manipulated variables associated with control of the component, said optimal setpoint values determined in accordance with one or more goals and constraints;
said plurality of multi-component optimization systems in communication with a respective distributed control system (DCS) to provide optimal setpoint values thereto, wherein the respective DCS provides regulation control of the respective power generating unit; and
a multi-unit optimization system for determining optimal values of said one or more goals and said constraints for operation of each of the component optimization system associated with each of said plurality of power generating units, wherein the multi-unit optimization system includes:
a multi-unit model for each of said components, each said multi-unit model receiving input values associated with manipulated variables and disturbance variables and predicting an output value for at least one controlled variable associated with operation of said component, and
a multi-unit optimizer for determining optimal setpoint values for manipulated variables and controlled variables associated with control of the component, said optimal setpoint values determined in accordance with one or more goals associated with operation of the power generating units and constraints associated with operation of the power generating units,
wherein said optimal setpoint values determined by the multi-unit optimizer are used to determine said one or more goals and said constraints for each of the component optimization systems associated with each of said plurality of power generating units.

2. A computer system according to claim 1, wherein said multi-unit model and said model of each component optimization system are selected from the group consisting of the following: a steady state model and a dynamic model.

3. A model computer system according to claim 1, wherein said multi-unit model and said model of each component optimization system are selected from the group consisting of the following: a neural network model, an empirically developed model, a model developed using "first principles," a support vector machine (SVM) model, a model developed by linear regression and a model based upon heuristics.

4. A computer system according to claim 1, wherein said multi-unit optimizer and said optimizer of each component optimization system are selected from the group consisting of:
linear programming, quadratic programming, mixed integer non-linear programming (NLP), stochastic programming, global non-linear programming, genetic algorithms, and particle/swarm techniques.

5. A computer system according to claim 1, wherein said optimizer of each component optimization system determines said optimal setpoint values for said manipulated variables by accessing said model to minimize a cost value of a cost function while observing said constraints, said cost value affected by the value of said manipulated variables.

6. A computer system according to claim 1, wherein said constraints include at least one of the following: a limit on emissions of NOx, a limit on emissions of $SO_2$, a limit on emissions of $CO_2$, a limit on emissions of CO, a limit on emissions of mercury, a limit on ammonia slip, and a limit on emissions of particulate matter.

7. A computer system according to claim 1, wherein said plurality of components includes at least one of the following: a fuel blending system, a boiler, a selective catalytic reduction (SCR) system, an electro-static precipitator (ESP) and a flue gas desulfurization (FGD) system.

8. A computer system according to claim 1, wherein said computer system further comprises a control system for each power generating unit, each said control system providing regulatory control of said respective power generating unit, said control system receiving said optimal setpoint values from each of said plurality of component optimization systems.

9. A computer system according to claim 1, wherein said multi-unit optimizer determines said optimal setpoint values by accessing said multi-unit model to minimize a cost value of a unit cost function while observing said constraints, said unit cost function including economic data associated with operation of said plurality of power generating units.

10. A computer system according to claim 9, wherein said economic data associated with operation of said plurality of power generating units relates to at least one of the following: cost of fuels, cost of additives, cost of ammonia, cost of limestone used in an FGD, cost of internal electric power for the power generating unit, price of electricity, cost of NOx credits, cost of $SO_2$ credits and price of gypsum.

11. A computer system according to claim 9, wherein said multi-unit model is selected from the group consisting of the following: a steady state model and a dynamic model.

12. A method for optimizing operation of a plurality of power generating units, each of said plurality of power generating units comprised of a plurality of components, the method comprising:
determining one or more goals and constraints associated with operation of the plurality of power generating units using a multi-unit optimization system; and
providing said one or more goals and constraints to a plurality of multi-component optimization systems, each multi-component optimization system respectively associated with one of said plurality of power generating units, wherein each multi-component optimization system is comprised of a plurality of component optimization systems, each component optimization system associated with optimizing one component of the respective power generating unit, wherein each component optimization system includes:
   a model of the component, said model receiving input values associated with manipulated variables and disturbance variables, and predicting an output value for at least one controlled variable associated with operation of the component, wherein the manipulated variables are variables changeable by an operator or a component optimization system to affect the at least one controlled variable, and
   an optimizer for determining optimal setpoint values for manipulated variables associated with control of the component, said optimal setpoint values determined in accordance with one or more goals and constraints determined by the multi-unit optimization system;
said plurality of multi-component optimization systems in communication with a respective distributed control system (DCS) to provide optimal setpoint values thereto, wherein the respective DCS provides regulation control of the respective power generating unit,
operating said components of each of said plurality of power generating units in accordance with the optimal setpoint values.

13. A method according to claim 12, wherein said multi-unit optimization system includes:
   a multi-unit model for each of said components, each said multi-unit model receiving input values associated with manipulated variables and disturbance variables and predicting an output value for at least one controlled variable associated with operation of said component, and
   a multi-unit optimizer for determining optimal values for at least one of manipulated variables and controlled variables associated with control of the component, said optimal values determined in accordance with one or more goals associated with operation of the power generating unit and constraints associated with operation of the power generating unit.

14. A method according to claim 13, wherein said multi-unit model and said model of each component optimization system are selected from the group consisting of the following: a steady state model and a dynamic model.

15. A method according to claim 13, wherein said multi-unit model and said model of each component optimization system are selected from the group consisting of the following: a neural network model, an empirically developed model, a model developed using "first principles," a support vector machine (SVM) model, a model developed by linear regression and a model based upon heuristics.

16. A method according to claim 13, wherein said multi-unit optimizer and said optimizer of each component optimization system are selected from the group consisting of:
   linear programming, quadratic programming, mixed integer non-linear programming (NLP), stochastic programming, global non-linear programming, genetic algorithms, and particle/swarm techniques.

17. A method according to claim 13, wherein said optimizer of each component optimization system determines said optimal setpoint values for said manipulated variables by accessing said model to minimize a cost value of a cost function while observing said constraints, said cost value affected by the value of said manipulated variables.

18. A method according to claim 13, wherein said multi-unit optimizer determines said optimal setpoint values by accessing said multi-unit model to minimize a cost value of a multi-unit cost function while observing said constraints, said multi-unit cost function including economic data associated with operation of said plurality of power generating units.

19. A method according to claim 18, wherein said economic data associated with operation of said plurality of power generating units relates to at least one of the following: cost of fuels, cost of additives, cost of ammonia, cost of limestone used in an FGD, cost of internal electric power for the power generating unit, price of electricity, cost of NOx credits, cost of $SO_2$ credits and price of gypsum.

20. A method according to claim 13, wherein said multi-unit model is selected from the group consisting of the following: a steady state model and a dynamic model.

21. A method according to claim 12, wherein said constraints include at least one of the following: a limit on emissions of NOx, a limit on emissions of $SO_2$, a limit on emissions of $CO_2$, a limit on emissions of CO, a limit on emissions of mercury, a limit on ammonia slip, and a limit on emissions of particulate matter.

22. A method according to claim 12, wherein said plurality of components includes at least one of the following: a fuel blending system, a boiler, a selective catalytic reduction (SCR) system, an electro-static precipitator (ESP) and a flue gas desulfurization (FGD) system.

* * * * *